United States Patent
Takahashi et al.

(10) Patent No.: US 11,668,964 B2
(45) Date of Patent: Jun. 6, 2023

(54) VIEWING ANGLE CONTROL ELEMENT AND DISPLAY DEVICE

(71) Applicant: Japan Display Inc., Tokyo (JP)

(72) Inventors: Yasuhiro Takahashi, Tokyo (JP); Jin Hirosawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/469,875

(22) Filed: Sep. 9, 2021

(65) Prior Publication Data
US 2022/0075215 A1   Mar. 10, 2022

(30) Foreign Application Priority Data

Sep. 10, 2020 (JP) .............................. JP2020-152296

(51) Int. Cl.
| | | |
|---|---|---|
| *G02F 1/13* | (2006.01) | |
| *G02F 1/1343* | (2006.01) | |
| *G02F 1/1335* | (2006.01) | |
| *G02F 1/163* | (2006.01) | |
| *G02F 1/157* | (2006.01) | |
| *G02F 1/155* | (2006.01) | |

(52) U.S. Cl.
CPC ........ *G02F 1/1323* (2013.01); *G02F 1/13439* (2013.01); *G02F 1/133512* (2013.01); *G02F 1/155* (2013.01); *G02F 1/157* (2013.01); *G02F 1/163* (2013.01)

(58) Field of Classification Search
CPC ............. G02F 1/1323; G02F 1/133512; G02F 1/13439; G02F 1/155; G02F 1/157; G02F 1/163
USPC ....................................................... 359/265
See application file for complete search history.

(56) References Cited

FOREIGN PATENT DOCUMENTS

| KR | 20200067001 A | * | 6/2020 |
| WO | 2014/084065 A1 |  | 6/2014 |

* cited by examiner

*Primary Examiner* — Edward J Glick
*Assistant Examiner* — William D Peterson
(74) *Attorney, Agent, or Firm* — Xsensus LLP

(57) ABSTRACT

According to one embodiment, a viewing angle control element includes an electrochromic layer, a plurality of projections formed on a first base, a first area and a second area provided on each of the projections, a first transparent electrode provided on the first area, and a second transparent electrode provided on the second area, wherein the first transparent electrode and the second transparent electrode are electrically independent of each other.

18 Claims, 18 Drawing Sheets

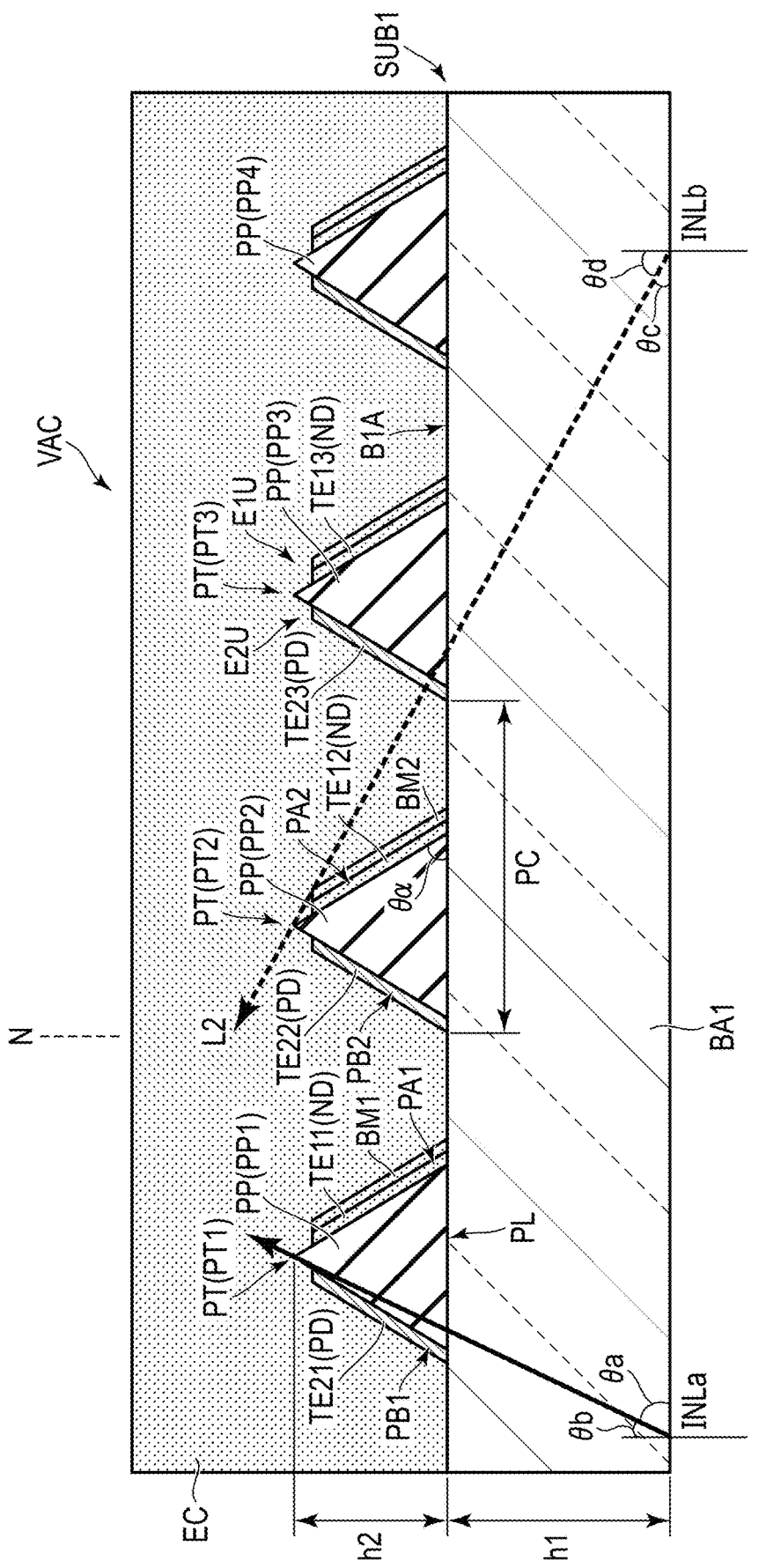
F I G. 11

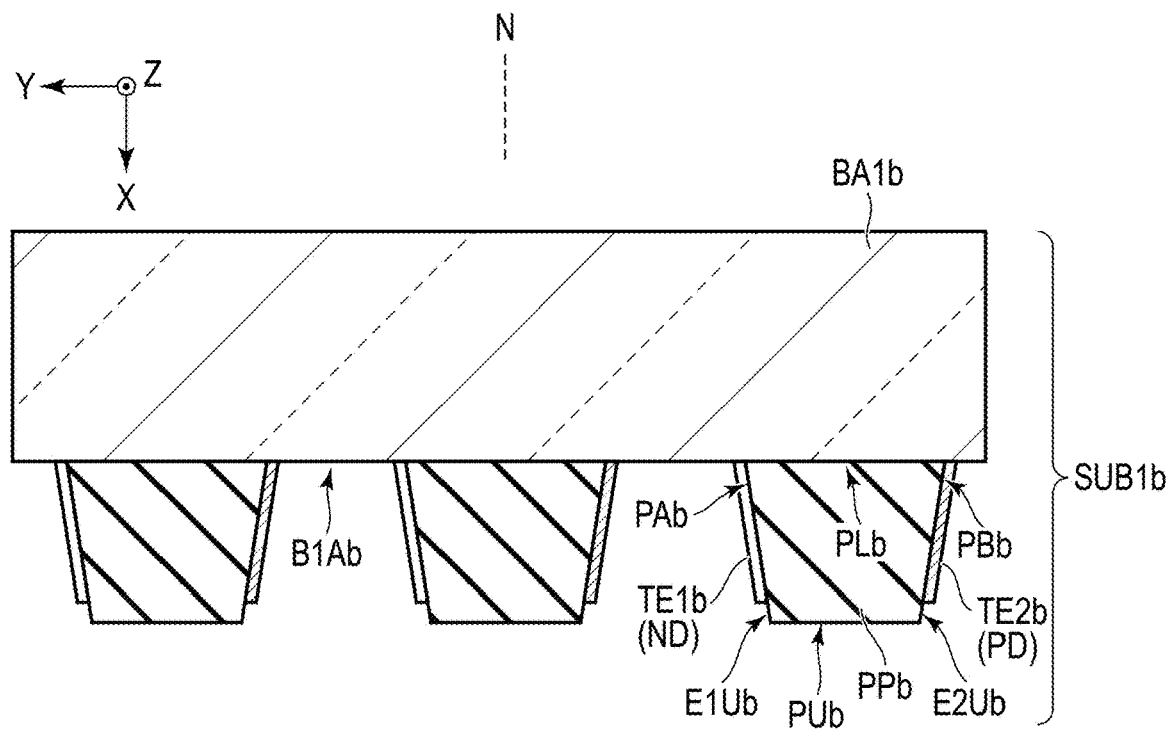
F I G. 14A
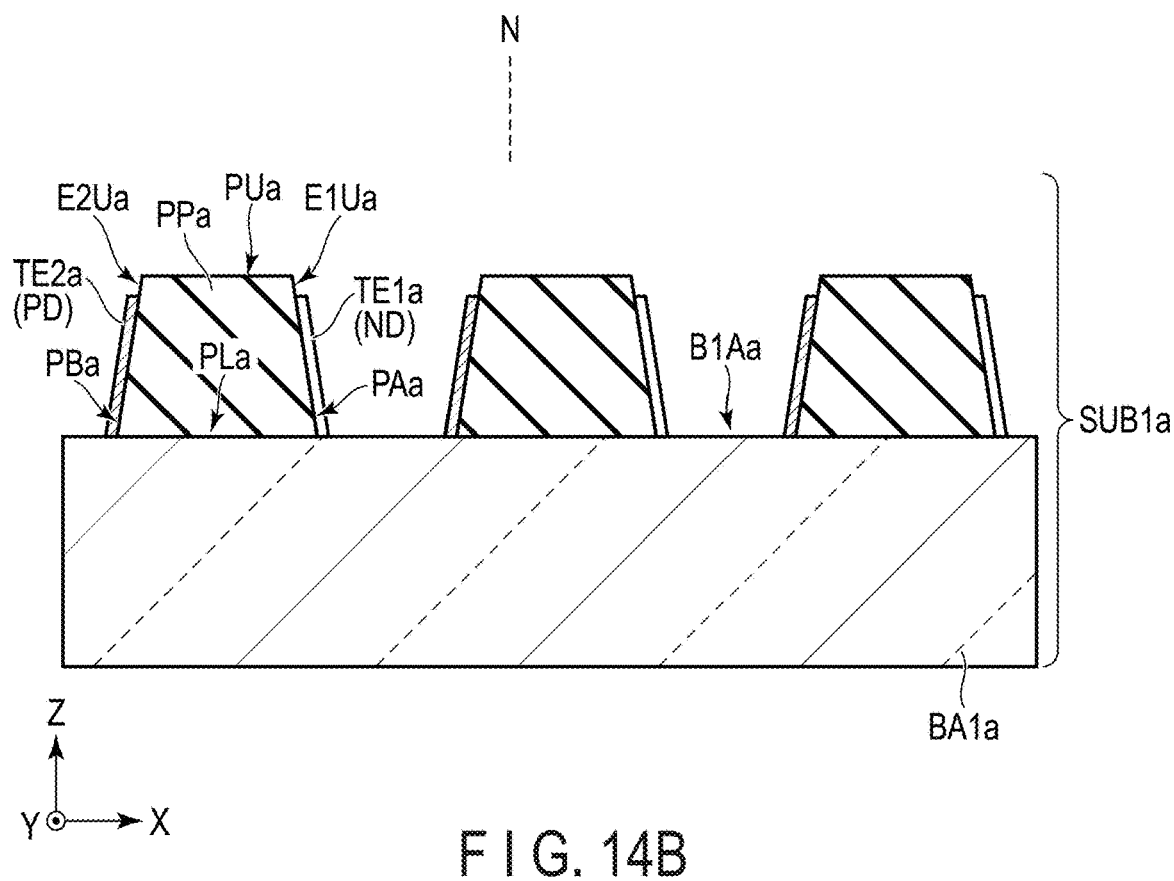
F I G. 14B

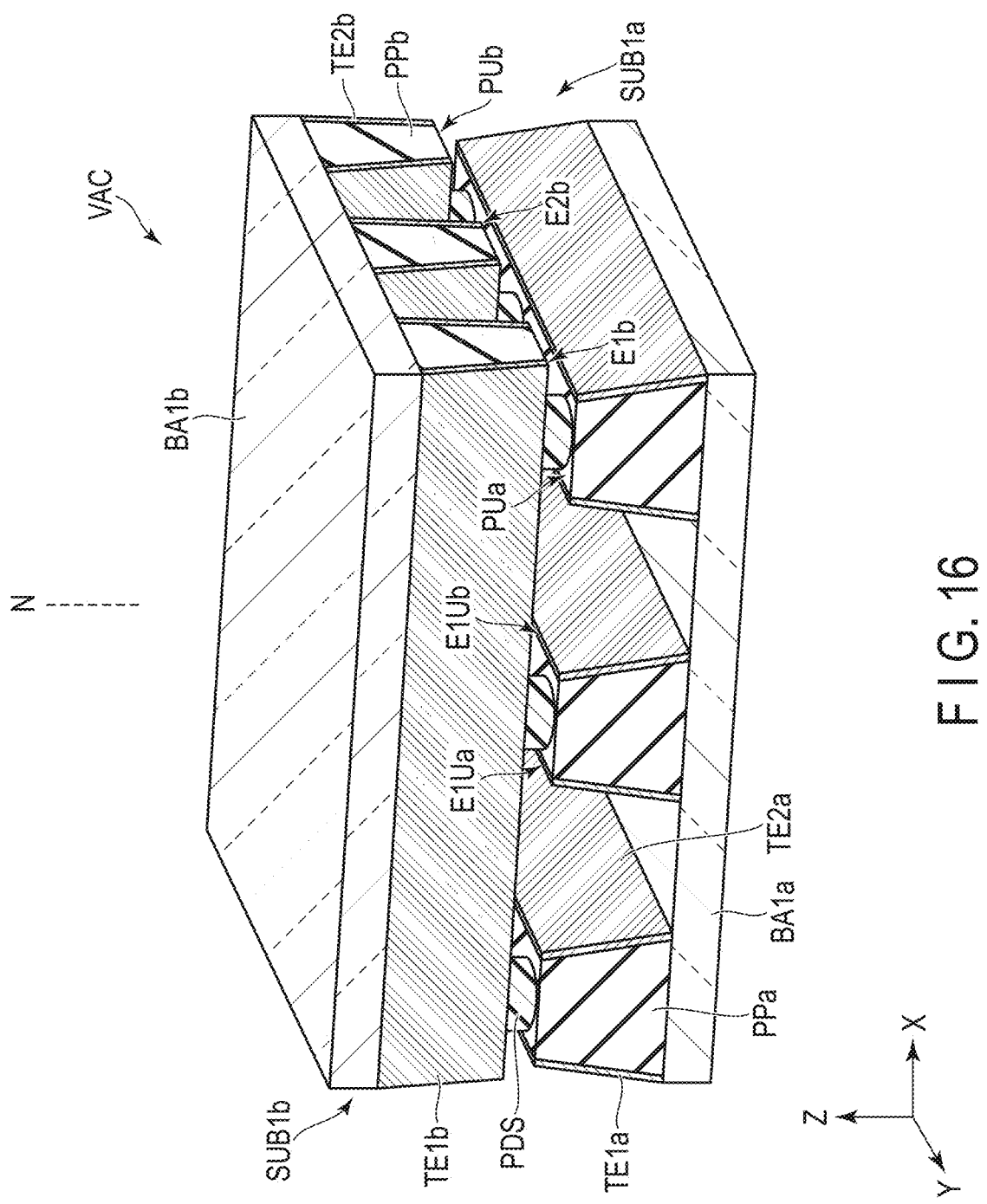
F I G. 16

VIEWING ANGLE CONTROL ELEMENT AND DISPLAY DEVICE

CROSS-REFERENCE TO RELATED APPLICATIONS

This application is based upon and claims the benefit of priority from Japanese Patent Application No. 2020-152296, filed Sep. 10, 2020, the entire contents of which are incorporated herein by reference.

FIELD

Embodiments described herein relate generally to a viewing angle control element and a display device.

BACKGROUND

In recent years, a variety of technologies to control a viewing angle at which a display panel can be observed have been proposed. As one example of the technologies, a viewing angle control device including a plurality of conductive patterns, a transparent conductive layer and an electrochromic layer interposed therebetween is known in which a louver is formed by depositing electrochromic materials on the conductive patterns. The viewing angle control device controls a viewing angle by controlling the number of electrochromic materials to be deposited, namely, the height of the louver.

BRIEF DESCRIPTION OF THE DRAWINGS

FIG. 11 is a sectional view showing a configuration example of the viewing angle control element of the embodiment.

FIG. 14A is a sectional view of the viewing angle control element of FIG. 13.

FIG. 14B is a sectional view of the viewing angle control element of FIG. 13.

FIG. 16 is a perspective view showing another configuration example of the viewing angle control element of the embodiment.

DETAILED DESCRIPTION

Figure 1:
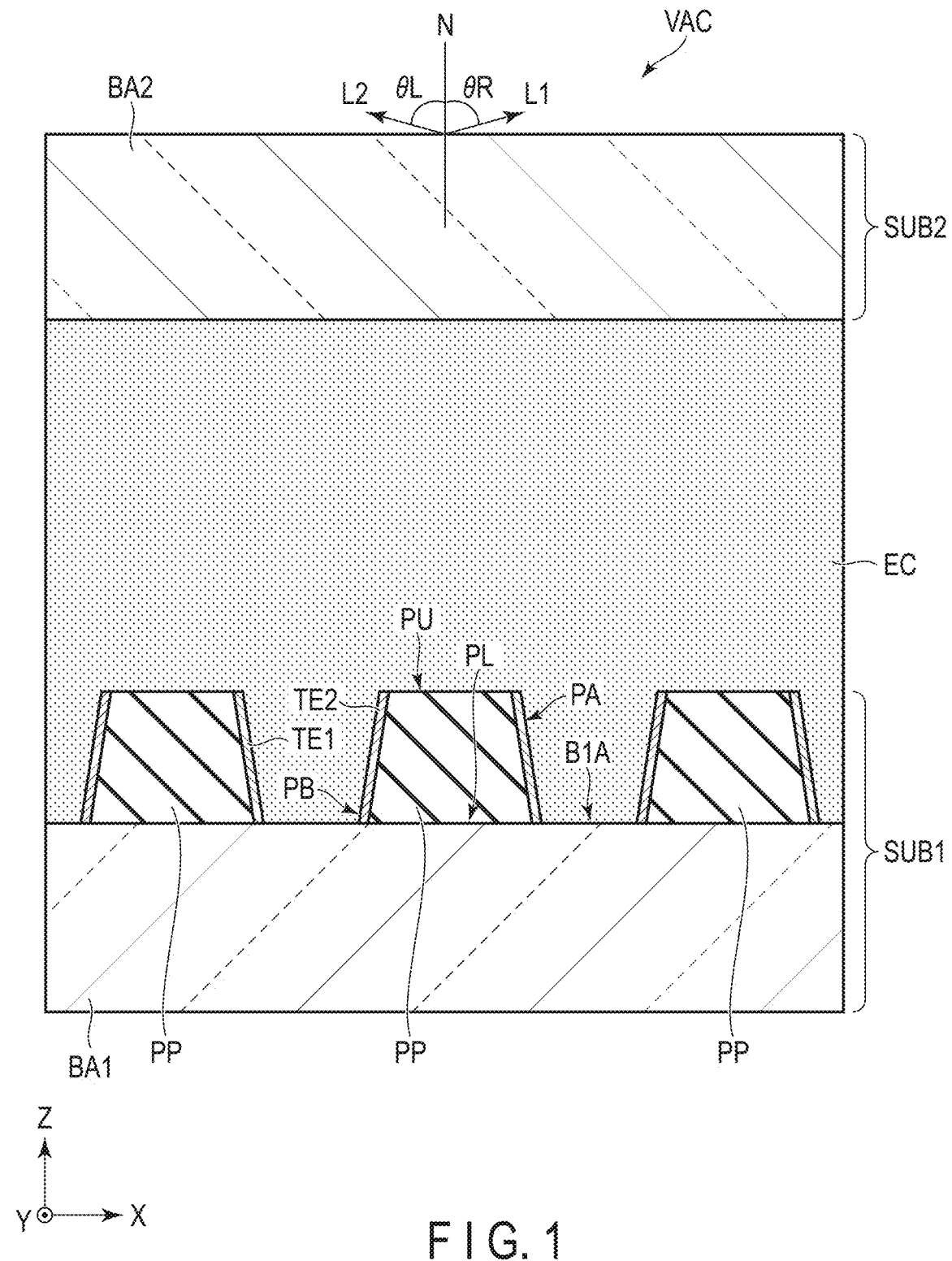
FIG. 1 is a sectional view of a viewing angle control element of an embodiment.

In general, according to one embodiment, a viewing angle control element includes a first substrate including a first base, a second substrate including a second base, an electrochromic layer provided between the first base and the second base, a plurality of projections formed on the first base, a first area and a second area provided on each of the projections, a first transparent electrode provided on the first area, and a second transparent electrode provided on the second area, wherein the first transparent electrode and the second transparent electrode are electrically independent of each other.

According to another embodiment, a viewing angle control element includes a first substrate including a first base, a second substrate including a second base, an electrochromic layer provided between the first base and the second base, a plurality of first projections formed on the first base, a first side surface and a second side surface provided on each of the first projections, a first transparent electrode provided on the first side surface, a second transparent electrode provided on the second side surface, a plurality of second projections formed on the second base, a third side surface and a fourth side surface provided on each of the second projections, a third transparent electrode provided on the third side surface, a fourth transparent electrode provided on the fourth side surface, wherein, the first transparent electrode and the second transparent electrode are electrically independent of each other, the third transparent electrode and the fourth transparent electrode are electrically independent of each other, and a direction in which the first projections extend and a direction in which the second projections extend intersect each other.

According to another embodiment, a display device includes a display panel including a plurality of pixels, and a viewing angle control element superposed on the display panel, the viewing angle control element including a first substrate including a first base, a second substrate including a second base, an electrochromic layer provided between the first base and the second base, a plurality of projections formed on the first base, a first area and a second area provided on each of the projections, a first transparent electrode provided on the first area, and a second transparent electrode provided on the second area, wherein the first transparent electrode and the second transparent electrode are electrically independent of each other.

According to an embodiment, a viewing angle control element and a display device, which are capable of controlling a viewing angle, can be provided.

The embodiment will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

A viewing angle control element according to the embodiment will be described in detail with reference to the drawings.

In the following descriptions, a first direction X, a second direction Y and a third direction Z are orthogonal to each other, but may intersect at an angle other than 90°. Further, a direction forwarding a tip of an arrow indicating the third direction Z is defined as "upward" or "downward" and a direction forwarding oppositely from the tip of the arrow is defined as "downward" or "upward".

With such expressions "a second member above a first member" and "a second member below a first member", the second member may be in contact with the first member or may be remote from the first member. In the latter case, there may be a third member interposed between the first member and the second member. In the meantime, such expressions "a second member on a first member" and "a first member on a second member", the second member may be in contact with the first member.

Further, there is an observation position where the viewing angle control element is observed on the tip side of the arrow in the third direction Z. Viewing the viewing angle control element from the observation position toward the X-Y plane defined by the first and second directions X and Y will be referred to as a planar view. Viewing the section of the viewing angle control element in the X-Z plane defined by the first and third directions X and Z or in the Y-Z plane defined by the second and third directions Y and Z will be referred to as a sectional view.

Embodiment

FIG. 1 is a sectional view of a viewing angle control element VAC according to an embodiment. The viewing angle control element VAC includes a first substrate SUB1, a second substrate SUB2 and an electrolyte layer EC. The first substrate SUB1 includes a first base BA1, a plurality of projections PP, a first transparent electrode TE1 and a second transparent electrode TE2. The projections PP are arranged at intervals in a first direction X and extend along a second direction Y. The second substrate SUB2 includes a second base BA2. The first and second substrates SUB1 and SUB2 are opposed to each other. In FIG. 1, the first transparent electrode TE1 functions as one of positive and negative electrodes PD and ND. The second transparent electrode TE2 functions as the other of the electrodes. Their details will be described later.

The first and second bases BA1 and BA2 are, for example, insulating substrates such as glass substrates and resin substrates. The first and second transparent electrodes TE1 and TE2 are formed of a transparent conductive material such as indium tin oxide (ITO) and indium zinc oxide (IZO). The projections PP are formed of, for example, a transparent insulating material, and may be formed of either an organic material or an inorganic material. In the example shown in FIG. 1, the projections PP are provided on the top surface B1A of the first base BA1, but another transparent insulating layer may be interposed between the first base BA1 and the projections PP.

The projections PP are arranged at intervals. The projections PP project from the first base BA1 toward the second substrate SUB2 (second base BA2) (along the third direction Z). Each of the projections PP has a bottom surface PL facing the first base BA1, a top surface PU facing the second substrate SUB2 (second base BA2), and side surfaces PA and PB. In the present embodiment, the side surface PA and side surface PB will also be referred to as a first side surface and a second side surface, respectively. The area of the projection PP including the side surface PA will be referred to as a first area, and the area of the projection PP including the side surface PB will be referred to as a second area.

The side surfaces PA and PB are arranged to face each other. The side face PA and top surface PU are in contact with each other, the side surface PA and bottom surface PL are in contact with each other, the side surface PB and top surface PU are in contact with each other, and the side surface PB and bottom surface PL are in contact with each other.

The projections PP have the shape of a trapezoid whose upper side is shorter than the lower side in sectional view, more specifically, in the X-Z plane. However, the shape of the projections PP is not limited to the trapezoid, but may be a trapezoid whose lower side is longer than the upper side, a quadrangle such as a rectangle and a square, a triangle to be described later, or another polygon. The projections PP may also be formed linearly symmetrical or asymmetrically as will be described later. The shape of the projections PP can be selected to be suitable for the viewing angle.

In the example shown in FIG. 1, the first transparent electrode TE1 is provided on the side surface PA of each of the projections PP. The second transparent electrode TE2 is provided on the side surface PB of each of the projections PP. The first and second transparent electrodes TE1 and TE2 are each connected to a bus line to be described later, and different potentials, such as positive and negative potentials, are applied to the first and second transparent electrodes TE1 and TE2.

In addition, neither of the first and second transparent electrodes TE1 and TE2 is provided on the top surface PU of the corresponding projection PP. It can be said that the first and second transparent electrodes TE1 and TE2 are electrically insulated by the top surface PU of the corresponding projection PP.

The electrolyte layer EC is provided between the first and second substrates SUB1 and SUB2 and is in contact with the first and second transparent electrode TE1 and TE2. The top surface PU of each of the projections PP is in contact with the electrolyte layer EC. The electrolyte layer EC is formed of, for example, a liquid electrolyte including an electrochromic material containing silver. The electrolyte layer EC to which no voltage is applied is generally transparent. In the present embodiment, the electrolyte layer EC containing silver will be described as an example. Instead of the electrolyte layer EC containing silver, a liquid electrolyte containing a redoxable reflective material or an electrochromic material including metallic materials such as platinum, gold, aluminum, manganese and lead, can be used as the electrolyte layer EC.

Another function layer such as an electrochromic layer may be provided between the electrolyte layer EC and the first transparent electrode TE1 or between the electrolyte layer EC and the second transparent electrode TE2. It can be said that the electrolyte layer EC is provided between the first and second bases BA1 and BA2.

When no voltage is applied to the electrolyte layer EC, the electrolyte layer EC is generally transparent and thus the viewing angle control element VAC is brought into a transparent state. That is, the incident light transmitted through the first substrate SUB1 is transmitted through the electrolyte layer EC and the second substrate SUB2. The light transmitted through the second substrate SUB2 is observed when its observation position is inclined to the right side of FIG. 1 with respect to the normal N and when it is inclined to the left side thereof with respect to the normal N, as well as when the light is observed from the direction along the normal N of the viewing angle control element VAC (the front to an observer) (the direction parallel to the third direction Z). For example, the angle θR between the light L1 transmitted toward the right side of FIG. 1 and the normal N and the angle θL between the light L2 transmitted toward the left side of FIG. 1 and the normal N are substantially equal to each other. This mode is called a wide viewing angle mode.

Figure 2:
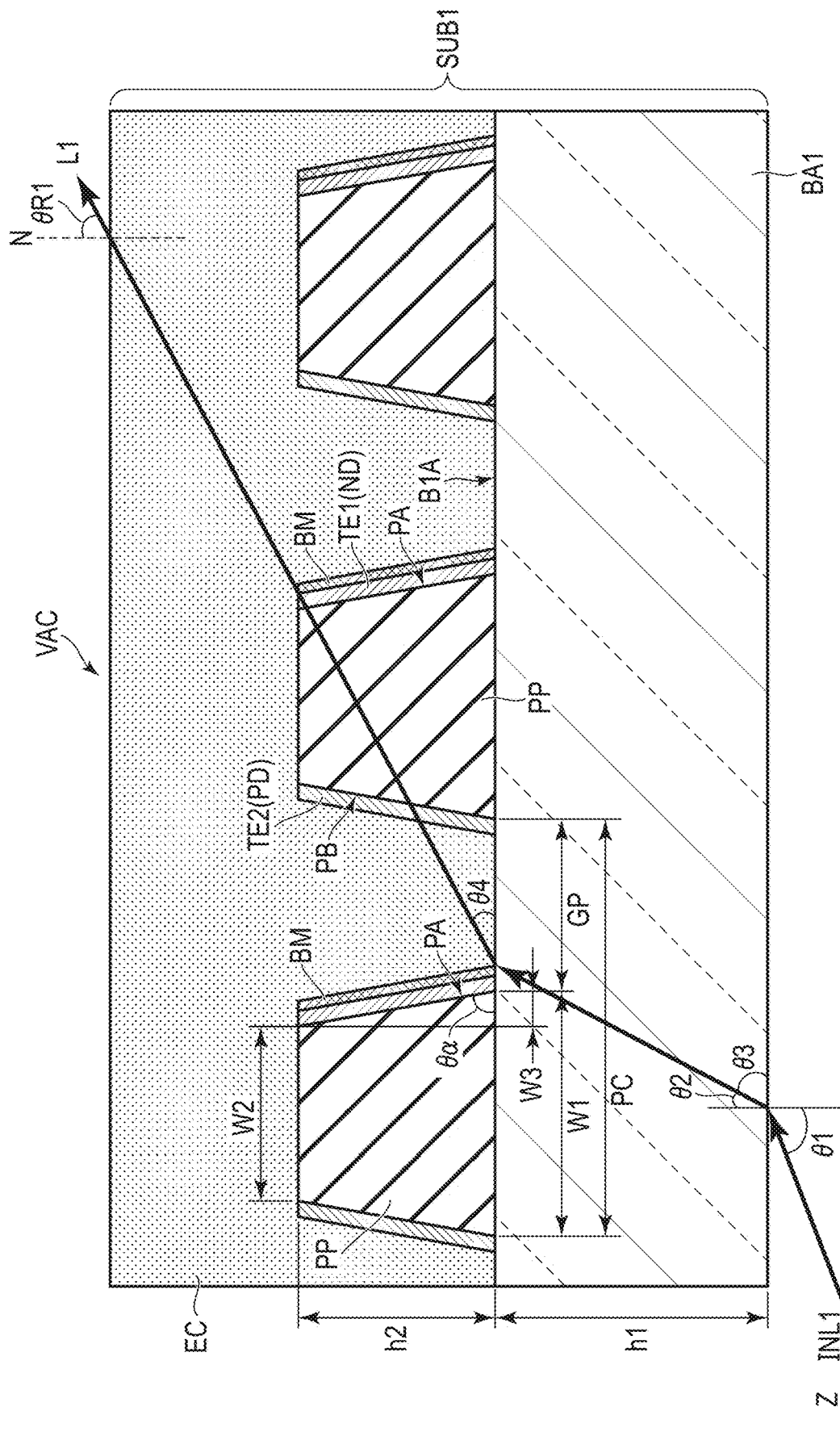
FIG. 2 is a partially enlarged view of the viewing angle control element shown in FIG. 1.

FIG. 2 is a partially enlarged view of the viewing angle control element shown in FIG. 1. In the viewing angle control element VAC of FIG. 2, for example, the potential of the first transparent electrode TE1 is controlled to be relatively lower (or more negative) than that of the second transparent electrode TE2. For example, a negative potential is applied to the first transparent electrode TE1 and a positive potential is applied to the second transparent electrode TE2. That is, the first transparent electrode TE1 functions as a negative electrode (cathode) ND, and the second transparent electrode TE2 functions as a positive electrode (anode) PD. In this ON state where a predetermined voltage is applied to the electrolyte layer EC, silver ions eluted into the electrolyte layer EC are reduced, and silver fine particles are deposited on the surface of the first transparent electrode TE1. Accordingly, the surface of the first transparent electrode TE1 is covered with the deposited silver to form a light-shielding layer BM as an aggregate of silver. The light-shielding layer BM is not formed on the side surface PB or top surface PU of each of the projections PP. The light-shielding layer BM may reflect or absorb the incident light transmitted through the first base BA1. When the application of voltage to the electrolyte layer EC is canceled or when the potential of the first transparent electrode TE1 is temporarily controlled to be relatively higher (or more positive) than that of the second transparent electrode TE2, the deposited silver is oxidized into silver ions and eluted into the electrolyte layer EC.

In the viewing angle control element VAC in the ON state described above, part of incident light INL1 transmitted through the first substrate SUB1 is shielded by the light-shielding layer BM. For example, paying attention to light incident upon one projection PP, part of the incident light INL1 directed to the right side of FIG. 2 is shielded by the light-shielding layer BM formed on the side surface PA of the projection PP. Of the light INL1 incident upon the projection PP, light (light L2 shown in FIG. 1) transmitted through the top surface PU is transmitted through the electrolyte layer EC and the second substrate SUB2. However, of the light reaching an interface between the second base BA2 and air, light whose incident angle is not less than the critical angle is totally reflected and is not transmitted through the second substrate SUB2.

In the ON state described above, the angle θR1 between the normal N and the light L1 observed when the observation position is inclined to the right side of FIG. 2 with respect to the normal N is smaller than the angle θR shown in FIG. 1. The mode in which a viewing angle becomes narrower than that in the steady state when the observation position is inclined to at least one side (for example, the right side or the left side) with respect to the normal N is called a narrow viewing angle mode.

Even in the ON state, silver ions are not deposited on the second transparent electrode TE2 that functions as a positive electrode (anode) PD, and thus no light-shielding layer BM is formed. When, in the ON state, no light-shielding layer BM is formed an incident light directed to the left side of FIG. 2 is denoted as the incident light INL2. The incident light INL2 is transmitted through the electrolyte layer EC and the second substrate SUB2 as described with reference to FIG. 1. In other words, the incident light INL2, which is directed to the left side of the drawing, is transmitted through the side surface PB and the second transparent electrode TE2 and further transmitted through the electrolyte layer EC and the second substrate SUB2.

If, in this ON state, the angle between the normal N and the light L2 observed when the observation position is inclined to the left side of the figure with respect to the normal N is θL1, θL1 is given by the following expression: θL>θL1>θR.

The viewing angle control element VAC shown in FIG. 2 is driven in the narrow viewing angle mode on the right side of FIG. 2 and in the wide viewing angle mode on the left side thereof. The right and left modes are not limited to the above. The viewing angle control element VAC may be driven in the wide viewing angle mode on the right side of FIG. 2 and in the narrow viewing angle mode on the left side thereof. In this case, a potential has only to be applied so that the first transparent electrode TE1 becomes a positive electrode (anode) PD and the second transparent electrode TE2 becomes a negative electrode (cathode) ND.

Assume here that the height of the first base BA1 along the third direction Z is h1, the height of the projection PP from the bottom surface PL to the top surface PU along the third direction Z is h2, the angle between the side surface PA and the bottom surface PL is θα, the width of the bottom surface PL (the width of a portion of the projection PP which is in contact with the top surface B1A) is W1, the width of the top surface PU is W2, and the width of the side surface PA (the width of a portion of the projection PP which is covered with the first transparent electrode TE1) is W3. Note that the width here corresponds to a length along the first direction X. Assume that the angle between the side surface PB, which is opposed to the side surface PA, and the bottom surface PL is also θα, and the width of the side surface PB is equal to the width W3 of the first side surface PA.

The width W3 satisfies the following equation: W3=(h2/tan(θα)).

The width W2 satisfies following equation: W2=(W1−2×h2/tan(θα)).

The width of a gap between adjacent projections PP is represented by GP. The pitch PC of each projection PP satisfies the following equation: PC=W1+GP.

If, in the ON-state viewing angle control element VAC, the angle of light L1 transmitted to the first substrate SUB1 through the second substrate SUB2 at the angle θR1 shown in FIG. 2 is θ1, the refraction angle is θ2, the refractive index of air is n0, and the refractive index of the first base BA1 is n1, the refraction angle θ2 is expressed by the following equation.

$$\theta 2 = \arcsin(n0/n1 \times \sin(\theta 1)) \tag{1}$$

Note that the angle $\theta 3$ satisfies the following equation: $\theta 3=(90°-\theta 2)$.

Of the light L1 transmitted through the projections PP, the light reaching the electrolyte layer EC from the lower end of the side surface PA of the left projection PP through the upper end of the side surface PA of the central projection PP has an entrance angle $\theta 4$, which is expressed by the following equation when the refractive index of the projections PP is n2. Note that the refractive index of the projections PP is the same as that of the electrolyte EC.

$$\theta 4=90°-\arcsin(n1/n2 \times \sin(\theta 2)) \quad (2)$$

Note that the angle $\theta 4$ is smaller than the angle $\theta \alpha$. The condition for shielding the light entering the projection PP at an angle smaller than the angle $\theta 4$ by the light-shielding layer BM, is given by the following expression.

$$\tan(\theta 4) \leq (h2/(GP+W1-W3)) \quad (3)$$

Figure 3:
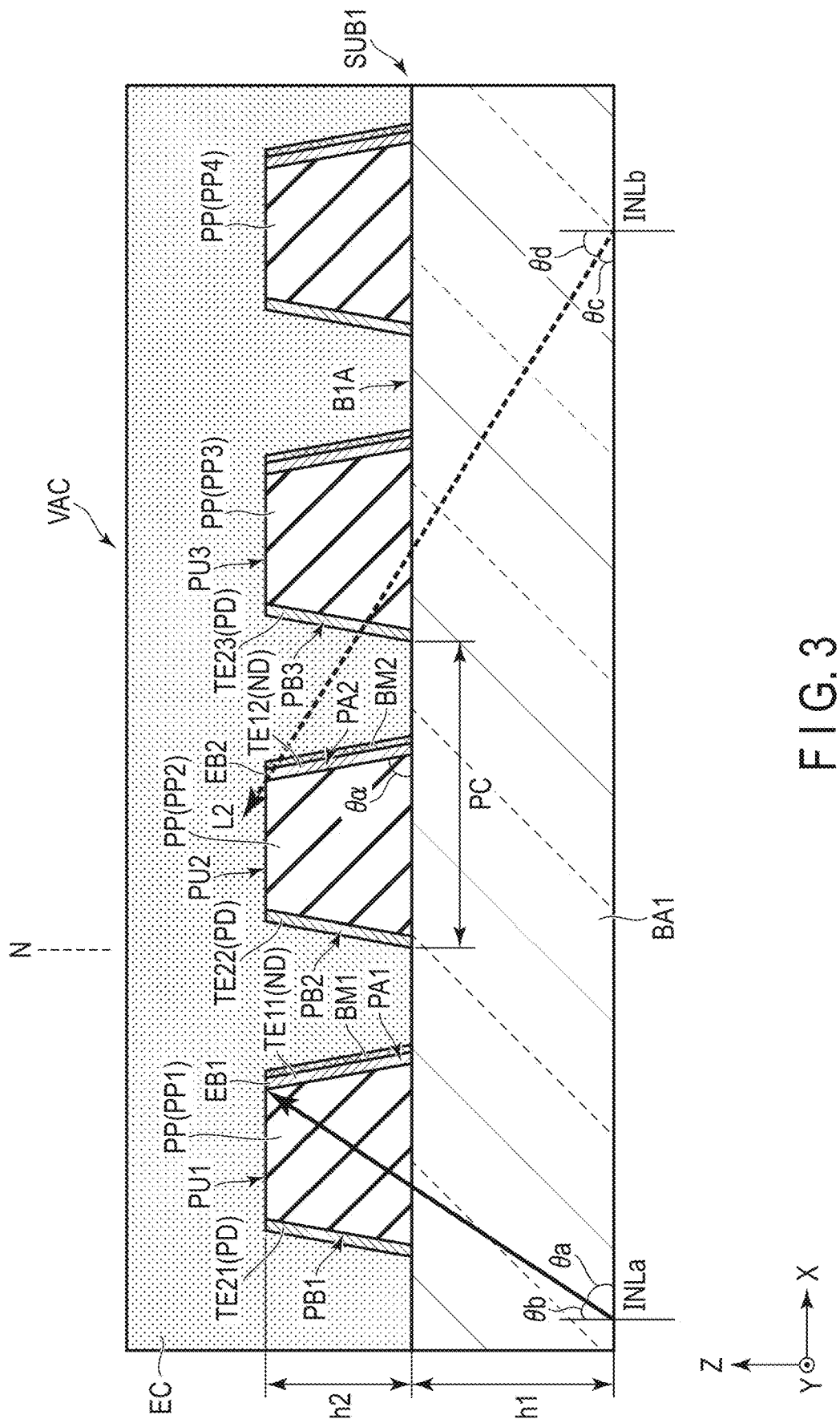
FIG. 3 is a partially enlarged view of the viewing angle control element shown in FIG. 1.

The relationship among the incidence angle of light to be shielded, the incidence angle of light to be transmitted and the viewing angle of light will be described with reference to FIG. 3. FIG. 3 is a partially enlarged view of the viewing angle control element shown in FIG. 1. Note that the viewing angle control element VAC shown in FIG. 3 is the same as the viewing angle control element VAC shown in FIG. 2 though two figures are prepared for the same viewing angle control element VAC for the sake of clarity. The detailed descriptions of the components overlapped with those in FIG. 2 are omitted. In FIG. 3, however, it is assumed that the refractive index n1 of the first base BA1 and the refractive index n2 of the projection PP are the same (n1=n2).

In the viewing angle control element VAC shown in FIG. 3, the incident light INLa is shielded by the light-shielding layer BM when the observation position is inclined to the right side of FIG. 3 with respect to the normal N.

The incident light INLb is incident light of light L2 to be observed when the observation position is inclined to the left side of FIG. 3 with respect to the normal N. The incident light INLa is transmitted through the projection PP, electrolyte layer EC and second base BA2 and observed as light L2.

The viewing angle control element VAC shown in FIG. 3 includes projections PP1, PP2, PP3 and PP4 as projections PP.

The projection PP1 has a side surface PA1, a side surface PB1 and a top surface PU1. The side surface PA1 is provided with a first transparent electrode TE11 and the side surface PB1 is provided with a second transparent electrode TE21. In the ON state, the first transparent electrode TE11 and the second transparent electrode TE21 function as a negative electrode ND and a positive electrode PD, respectively. On the first transparent electrode TE11, a light-shielding layer BM1 is formed of deposited silver.

Similarly, the projection PP2 has a side surface PA2, a side surface PB2 and a top surface PU2. The side surface PA2 is provided with a first transparent electrode TE11 and the side surface PB2 is provided with a second transparent electrode TE22. In the ON state, the first transparent electrode TE12 and the second transparent electrode TE22 function as a negative electrode ND and a positive electrode PD, respectively. On the first transparent electrode TE12, a light-shielding layer BM2 is formed of deposited silver.

The same as the above projections PP1 and PP2 is true of the projections PP3 and PP4, excluding the reference numerals.

Of the angles of light INLa upon the first base BA1, the maximum angle is defined as angle $\theta a$. Of the angles of light INLa upon the first base BA1, the maximum angle is defined as angle $\theta c$.

When the height of the projection PP is h2, the taper angle is $\theta \alpha$ and the pitch is PC, the angles $\theta a$ and $\theta c$ are expressed by the following equations.

$$\tan \theta a = h2/(PC-(h2/\tan \theta \alpha)) \quad (4)$$

$$\tan \theta c = h2/(PC+(h2/\tan \theta \alpha)) \quad (5)$$

As shown in FIG. 3, the incident light INLa is transmitted toward the projection PP1 through the first base BA1 and shielded by the light-shielding layer BM1 formed on the side surface PA1 of the projection PP1. The angle $\theta \alpha$ is an angle at which the incident light INLa is transmitted through an end portion of the light-shielding layer BM1, which is close to the top surface PU (an upper end portion of the light-shielding layer BM1). However, as shown in FIG. 3, the thickness of each of the light-shielding layer BM1 and first transparent electrode TE1 is extremely smaller than the height h2 of each of the projections PP. Thus, the end portion of the light-shielding layer BM1 is regarded as an end portion EB1 of the projection PP1 (an end portion where the side surface PA1 and the top surface PU1 intersect). The incident light INLa is thus transmitted through the end portion EB1 of the projection PP1 at angle $\theta a$.

On the other hand, as shown in FIG. 3, the incident light INLb is transmitted through the first base BA1 and the side surface PB3 of the projection PP3 and shielded by the light-shielding layer BM formed on the side surface PA2 of the projection PP2 adjacent to the projection PP3. Since the light-shielding layer BM1 and the first transparent electrode TE1 are extremely thin as described above, the incident light INLb is transmitted through an end portion EB2 of the projection PP2 (an end portion where the side surface PA2 and the top surface PU2 intersect) at angle $\theta c$.

The viewing angle $\theta b$ with respect to the first direction X (in which the traveling direction of the incident light INLa is projected on the Y-Z plane) satisfies the following equation: $\theta b=(90°-\theta a)$. The viewing angle $\theta d$ with respect to a direction opposite to the first direction X (in which the traveling direction of the incident light INLb is projected on the Y-Z plane) satisfies the following equation: $\theta d=(90°-\theta c)$.

Since $\tan(90°-\theta)$ is equal to $1/\tan \theta$, the viewing angles $\theta b$ and $\theta d$ are expressed by the following equations.

$$\tan \theta b = (PC-(h2/\tan \theta \alpha))/h2 \quad (6)$$

$$\tan \theta d = (PC+(h2/\tan \theta \alpha))/h2 \quad (7)$$

From the above equations (6) and (7), the relationship between the height h2 of the projection PP and the viewing angles $\theta b$ and $\theta d$ can be seen. For example, when the viewing angles $\theta b$ and $\theta d$ are fixed, the optimum height h2 can be obtained from the equations (6) and (7). On the other hand, for example, when the height or the range of the projection PP is fixed, the optimum values of the viewing angles $\theta b$ and $\theta d$ can be obtained from the equations (6) and (7).

The equations (1), (2) and (4) to (7) and expression (3) do not depend on the height h1 of the first base BA1, but only on the height h2 of the projection PP. Thus, the height h2 may simply be referred to as height h. In the equations (6) and (7), the viewing angles $\theta b$ and $\theta d$ may be referred to as a first viewing angle $\theta 1$ and a second viewing angle $\theta 2$, respectively.

Figure 4:
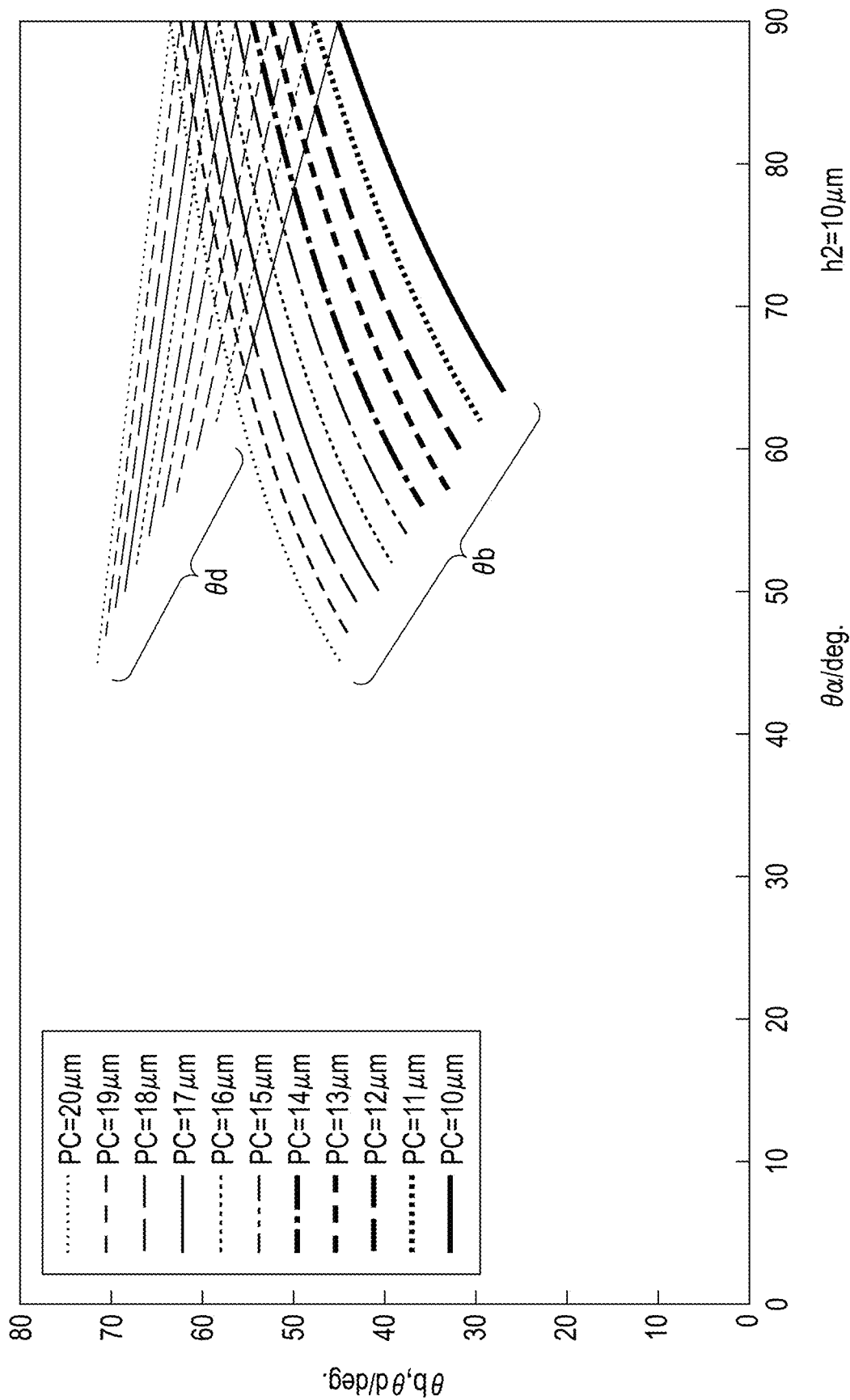
FIG. 4 is a graph showing the relationship among a viewing angle, a pitch and the angle of a projection when the height of the projection is fixed.

FIG. 4 is a graph showing the relationship among the viewing angle θb (transmission), the viewing angle θd (transmission), the pitch PC, and the angle θα of the projection PP when the height h2 of the projection PP is fixed. In the example shown in FIG. 4, the height h2 of the projection PP is 10 μm.

As shown in FIG. 4, the minimum value of the angle θα of the projection PP is approximately 45°. When the angle θα increases and approaches 90°, the viewing angle θb increases and the viewing angle θd decreases.

As the pitch PC increases, both the viewing angles θb and θd increase. However, as the pitch PC increases, the length (width) of the viewing angle control element VAC in the first direction X increases.

Figure 5:
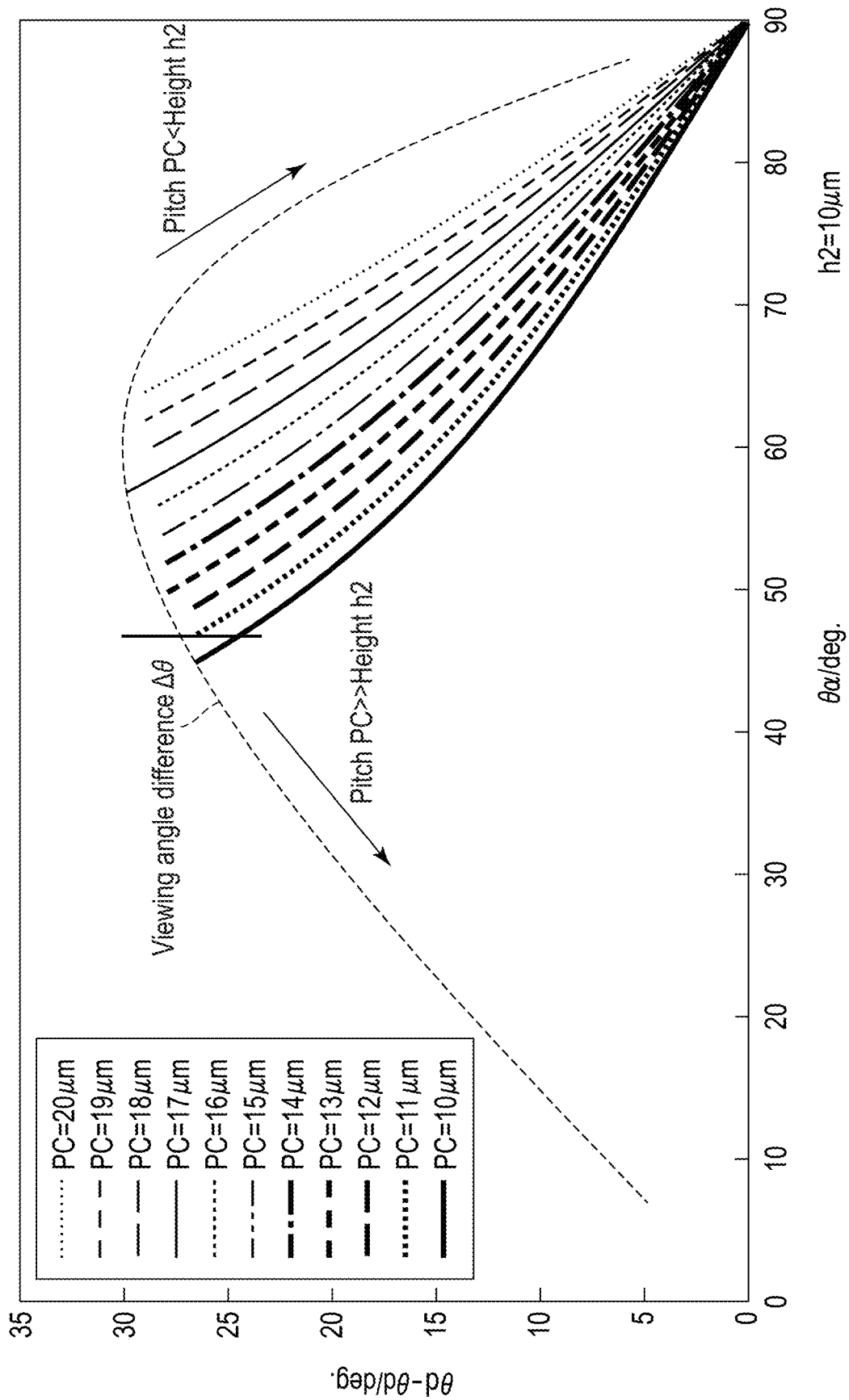
FIG. 5 is a graph showing the relationship among a viewing angle difference, a pitch and the angle of a projection when the height of the projection is fixed.

FIG. 5 is a graph showing the relationship among the viewing angle difference Δθ (Δθ=θd−θb), the pitch PC, and the angle θα of the projection PP when the height h2 of the projection PP is fixed.

As shown in FIG. 5, the viewing angle difference Δθ is maximized when the angle θα is in the range of 60° through 70° (equal to or more than 60°, and, equal to or less than 70°). In this case, the pitch PC is preferably 10 μm through 14 μm (equal to or more than 10 μm, and, equal to or less than 14 μm) (10≤PC≤14). Conversely, when the angle θα of the projection PP is 60° through 70° and the pitch PC is 10 μm through 14 μm, the maximum viewing angle difference Δθ can be obtained.

The present embodiment can thus make it possible to obtain a viewing angle control element VAC capable of controlling a viewing angle.

The different parameters shown in FIGS. 4 and 5 are an example and thus the present embodiment is not limited thereto. For example, when the size of the viewing angle control element VAC, the display device including the viewing angle control element VAC, and the like is large to increase the height h2 of the projection PP and the pitch PC, the viewing angles θb and θd and the viewing angle difference Δθ can be changed accordingly. In this case, the optimum viewing angles θb and θd and the viewing angle difference Δθ (Δθ=θd−θb) can be obtained by the equations (6) and (7).

Figure 6:
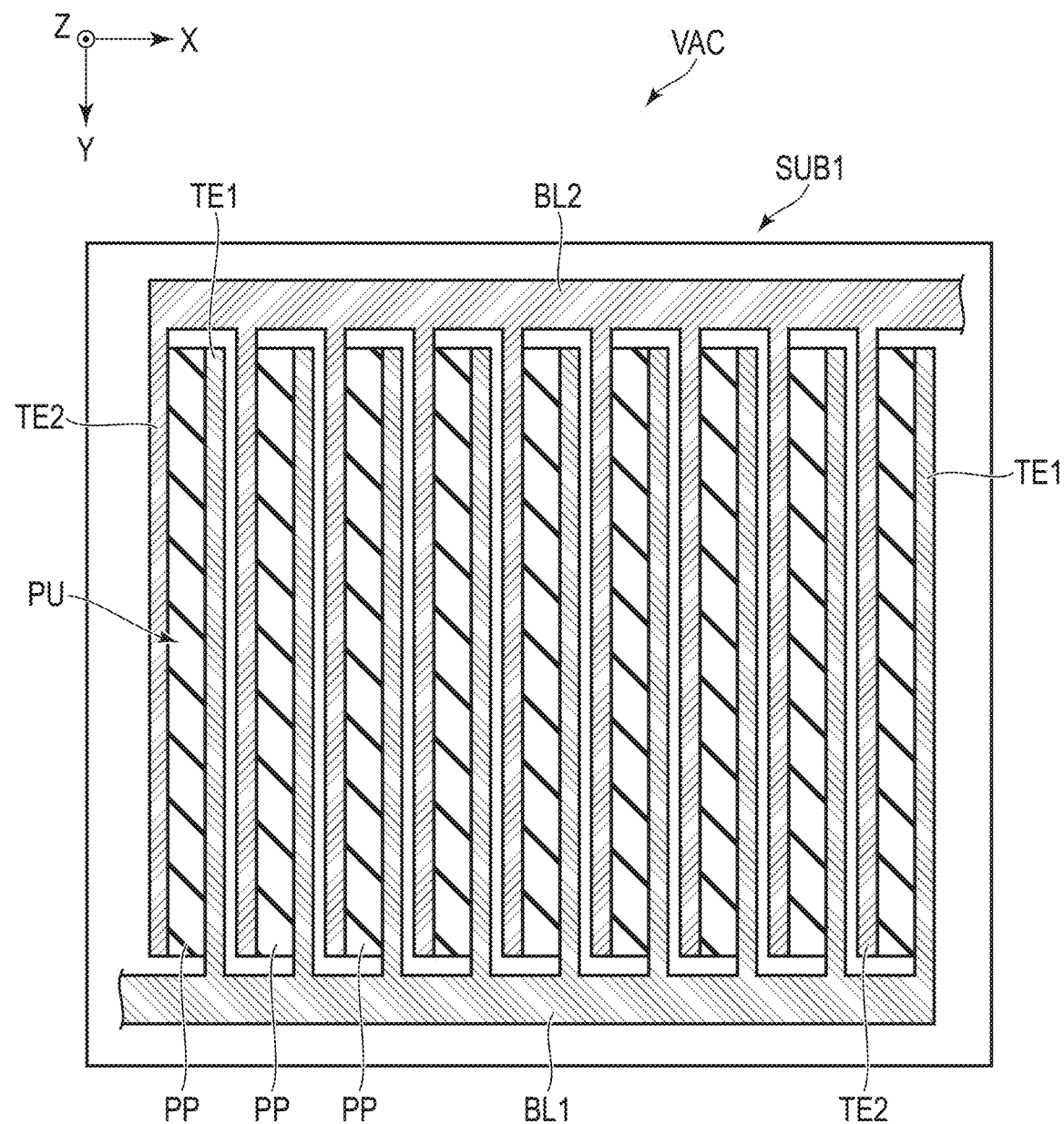
FIG. 6 is a plan view of a first substrate.

Bus lines connected to the first and second transparent electrodes TE1 and TE2 will be described with reference to FIG. 6. FIG. 6 is a plan view of the first substrate SUB1.

As described above, the projections PP are arranged at intervals in the first direction X and extend along the second direction Y. The first transparent electrodes TE1 are connected to a bus line BL1 to be formed integrally therewith. The bus line BL1 extends along the first direction X. The first transparent electrodes TE1 are arranged in the first direction X and extend along the second direction Y. That is, the first transparent electrodes TE1 extend substantially in parallel to the projections PP in a planar view. The first transparent electrodes TE1 are provided on the side surfaces PA of the projections PP as described above.

The second transparent electrodes TE2 are connected to a bus line BL2 to be formed integrally therewith. The bus line BL2 extends along the first direction X. The second transparent electrodes TE2 are arranged in the first direction X and extend along the second direction Y. That is, the second transparent electrodes TE2 extend substantially in parallel to the projections PP in a planar view. The second transparent electrodes TE2 are provided on the side surfaces PB of the projections PP as described above.

Next is a description of a display device DSP to which the foregoing viewing angle control element VAC is applied.

Figure 7:
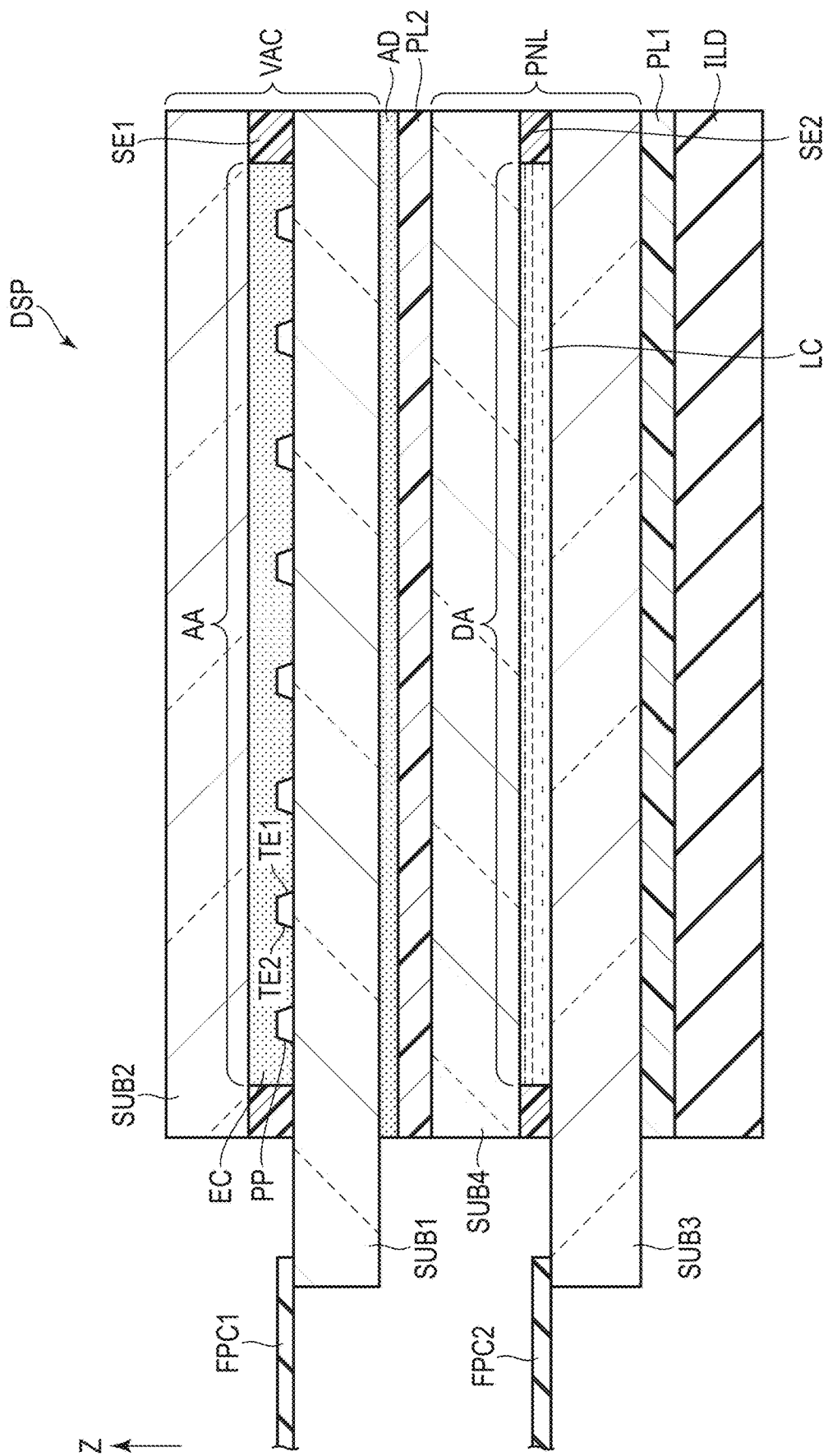
FIG. 7 is a sectional view showing a display device according to the embodiment.

FIG. 7 is a sectional view of the display device DSP. The display device DSP includes a viewing angle control element VAC and a display panel PNL. The display panel PNL may be a transmissive display panel that selectively transmits illumination light, a reflective display panel that selectively reflects illumination light and a display panel including a spontaneous light-emitting element such as an organic electroluminescent element. Examples of the transmissive or reflective display panel PNL include a display panel having a liquid crystal layer and a display panel having an electrophoretic layer. In the display device DSP shown in FIG. 7, the display panel PNL is a transmissive liquid crystal display panel. Thus, the display device DSP further includes an illumination device ILD that illuminates the display panel PNL, a first polarizer PL1 and a second polarizer PL2. Along the thickness direction (third direction Z) of the display device DSP, the illumination device ILD, first polarizer PL1, display panel PNL, second polarizer PL2 and viewing angle control element VAC are arranged in the order presented. However, the arrangement of the illumination device ILD, display panel PNL and viewing angle control element VAC is not limited to the order. For example, the viewing angle control element VAC may be provided between the illumination device ILD and the display panel PNL. The order in which the illumination device ILD, display panel PNL and viewing angle control element VAC are stacked, can appropriately be changed.

As described above, the viewing angle control element VAC includes a first substrate SUB1, a second substrate SUB2 and an electrolyte layer EC. The electrolyte layer EC is held between the first and second substrates SUB1 and SUB2 and sealed with a seal SE1. The area surrounded by the seal SE1 will be referred to as an effective area or an active area AA. As for the active area AA, only the main part is simplified and illustrated. As described above, the first substrate SUB1 is provided with projections PP, first transparent electrodes TE1 and second transparent electrodes TE2. The first and second transparent electrodes TE1 and TE2 are in contact with the electrolyte layer EC. A wiring board FPC1 is connected to the first board SUB1.

The display panel PNL includes a third substrate SUB3, a fourth substrate SUB4 and a liquid crystal layer LC. The liquid crystal layer LC is held between the third and fourth substrates SUB3 and SUB4 and sealed with a seal SE2. The area surrounded by the seal SE2 has a display area DA for displaying an image. A known liquid crystal panel can be applied to the display panel PNL. A wiring board FPC2 is connected to the third board SUB3.

The viewing angle control element VAC is superposed on the display panel PNL. The active area AA of the viewing angle control element VAC is superposed on the display area DA of the display panel PNL.

The first polarizer PL1 is located between the illumination device ILD and the display panel PNL and is bonded to, for example, the third substrate SUB3. The second polarizer PL2 is located between the display panel PNL and the viewing angle control element VAC and is bonded to, for example, the fourth substrate SUB4. The first and second polarizers PL1 and PL2 are so arranged that, for example, their polarization axes are substantially orthogonal to each other (cross-Nicol system). The first and second polarizers PL1 and PL2 may include different retardation films.

The viewing angle control element VAC is bonded to the second polarizer PL2 by a transparent adhesive layer AD.

The illumination device ILD is located behind the display panel PNL with the first polarizer PL1 therebetween. The illumination device ILD is what is called a surface light source device, and is configured to emit illumination light from behind the display panel PNL to illuminate the display panel PNL. Of the illumination light emitted from the illumination device ILD, a polarization component transmitted through the first polarizer PL1 is transmitted through the display panel PNL. Of the light transmitted through the display panel PNL, a polarization component transmitted through the second polarizer PL2 is transmitted through the viewing angle control element VAC.

The display device DSP including the viewing angle control element VAC described above can be driven in a narrow viewing angle mode on the right side of FIG. 7 and in a wide viewing angle mode on the left side thereof when viewed from the third direction Z, for example. These modes can be switched by voltages applied to the first and second transparent electrodes TE1 and TE2.

Figure 8A:
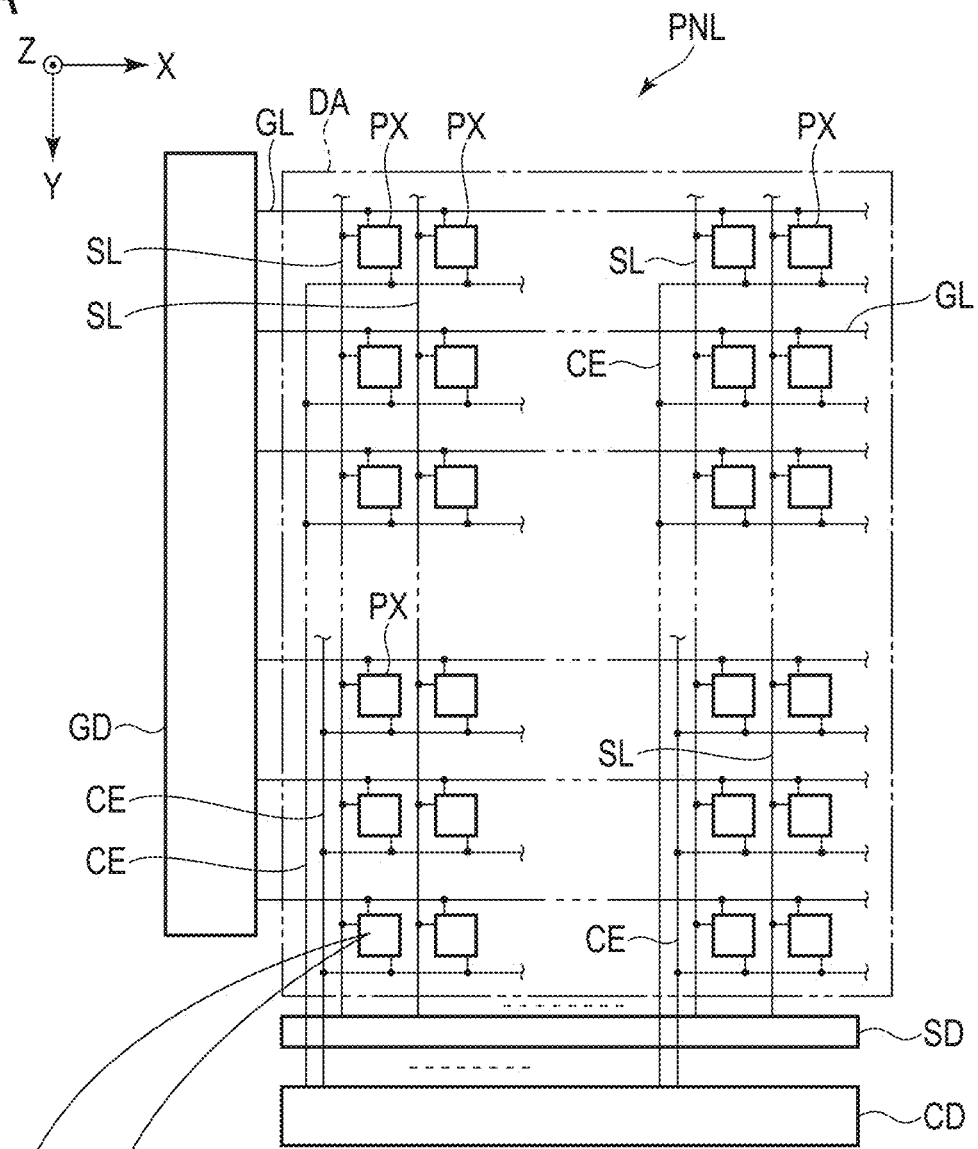
FIG. 8A is a diagram illustrating a display panel.
Figure 8B:
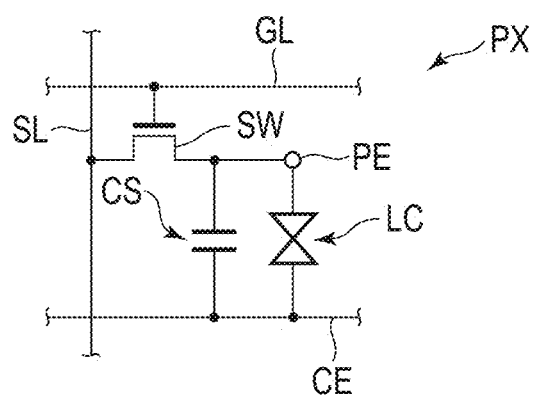
FIG. 8B is a diagram illustrating a display panel.

Here is a more detailed description of the configuration of the display panel PNL. FIGS. 8A and 8B illustrate a display panel. FIG. 8A is a circuit diagram of the display panel PNL. FIG. 8B is a circuit diagram of a pixel PX.

In the display panel PNL shown in FIG. 8A, the display area DA includes a plurality of pixels PX arranged in a matrix in the first and second directions X and Y. The pixels PX are minimum units that can be controlled individually in response to a pixel signal, and may be referred to as sub-pixels. The pixels PX are, for example, red pixels for displaying red or green pixels for displaying green or blue pixels for displaying blue.

A plurality of scanning lines GL are connected to a scanning line drive circuit GD. A plurality of signal lines SL are connected to a signal line drive circuit SD. A common electrode CE is placed all over the pixels PX and is connected to a voltage apply unit CD.

Each of the pixels PX includes a switching element SW, a pixel electrode PE, and the like. The switching element SW is formed of, for example, a thin-film transistor (TFT) and electrically connected to its corresponding scanning line GL and signal line SL. In other words, the scanning line GL is electrically connected to a switching element SW in each of the pixels PX arranged in the first direction X, and the signal line SL is electrically connected to a switching element SW in each of the pixels PX arranged in the second direction Y. The pixel electrode PE is electrically connected to its corresponding switching element SW. The common electrode CE is provided in common for a plurality of pixel electrodes PE. The liquid crystal layer LC is driven by an electric field generated between the pixel electrodes PE and the common electrode CE. Capacitance CS is formed, for example, between an electrode having the same potential as the common electrode CE and an electrode having the same potential as the pixel electrodes PE.

The pitch of the pixels PX and the pitch PC of the projections PP are preferably different from each other, which will be described in detail later. This is because if the pitch of the pixels PX and the pitch PC of the projections PP are the same, moire or the like occurs to degrade the display quality of the display device DSP. In addition, the pitch of the pixels PX is preferably not a common divisor of the pitch PC of the projections PP. This is because if the pitch of the pixels PX is a common divisor of the pitch PC of the projections PP, the arrangement cycle of the pixels PX may coincide with the pitch PC of the projections PP, and moire is likely to occur.

As described above, the present embodiment makes it possible to provide a viewing angle control element and a display device capable of controlling a viewing angle.

Figure 9A:
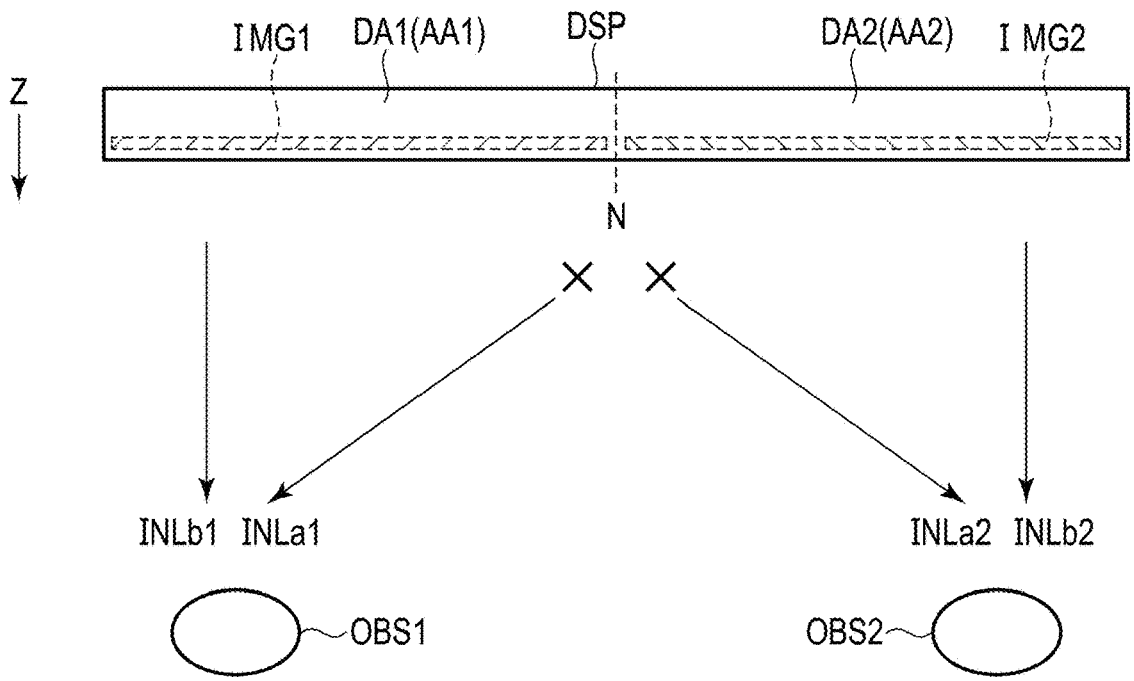
FIG. 9A is a diagram illustrating an applied example of the display device.
Figure 9B:
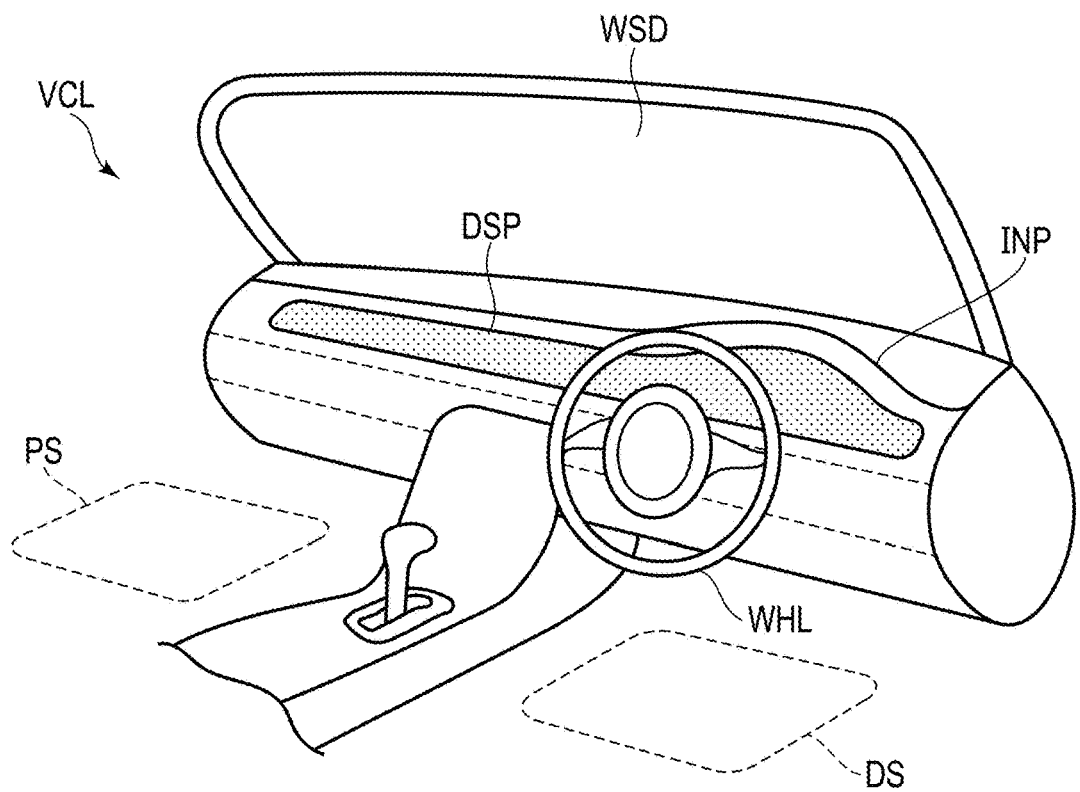
FIG. 9B is a diagram illustrating an applied example of the display device.

FIGS. 9A and 9B each illustrate an applied example of a display device. FIG. 9A is a plan view of a display device DSP including a viewing angle control element VAC and a display panel PNL. FIG. 9B illustrates a display device DSP provided in a vehicle VCL.

In the display device DSP shown in FIG. 9A, an observer OBS1 is located on the right side of the figure and another observer OBS2 is located on the left side thereof. In the display area DA of the display panel PNL, the right side of the figure is defined as a display area DA1 and the left side thereof is defined as a display area DA2. The display areas DA1 and DA2 respectively correspond to active areas AA1 and AA2 of the viewing angle control element VAC.

Consider here that different images IMG1 and IMG2 are displayed in the display areas DA1 and DA2, respectively.

When the observer OBS1 observes the display device DSP (viewing angle control element VAC) from a direction (front) along a normal N, light INLb1 that is incident along the direction of the normal N is transmitted through the display device DSP without being shielded by a light-shielding layer BM of the viewing angle control element VAC. That is, the observer OBS1 can observe the image IMG1 displayed in the display area DAL When the observer OBS1 observes the display area DA2 of the display device DSP, a light-shielding layer BM is formed in the viewing angle control element VAC so as to shield light INLa1 that is incident along a direction from the display area DA2 toward the observer OBS1. Thus, the observer OBS1 cannot observe the image IMG2 displayed in the display area DA2.

Similarly, when the observer OBS2 observes the display device DSP (viewing angle control element VAC) from a direction (front) along the normal N, light INLb2 that is incident along the normal N is transmitted through the display device DSP without being shielded by the light-shielding layer BM of the viewing angle control element VAC. That is, the observer OBS2 can observe the image IMG2 displayed in the display area DA2.

When the observer OBS2 observes the display area DA1 of the display device DSP, a light-shielding layer BM is formed in the viewing angle control element VAC so as to shield light INLa2 that is incident along a direction from the display area DA1 toward the observer OBS2. Thus, the observer OBS2 cannot observe the image IMG1 displayed in the display area DA'.

In order to form the light-shielding layer BM as described above, a potential has only to be applied to each of the first and second transparent electrodes TE1 and TE2 provided in their respective active areas AA1 and AA2 (corresponding to the display areas DA1 and DA2). As described above, it is possible to obtain a display device DSP which allows the observer OBS1 and OBS2 to observe different images IMG1 and IMG2, respectively and which inhibits the observer OBS1 and OBS2 from observing the images IMG2 and IMG1, respectively.

FIG. 9B shows a vehicle VCL equipped with the display device DSP shown in FIG. 9A. The display device DSP is mounted on an instrument panel INP of the vehicle VCL. The display device DSP is provided over a driver's seat DS with the wheel WHL and a passenger seat PS on the opposite side of the driver's seat DS.

In the example shown in FIG. 9B, a driver sitting on the driver's seat DS corresponds to the observer OBS2 and a passenger sitting on the passenger seat PS corresponds to the observer OBS1. For example, the driver (observer OBS2) can observe the image IMG2 such as a map displayed on the display device DSP, and the passenger (observer OBS1) can observe the image IMG1 such as a movie.

The foregoing embodiment makes it possible to provide a viewing angle control element capable of controlling a viewing angle, a display device, and a vehicle equipped with the display device.

Figure 10A:
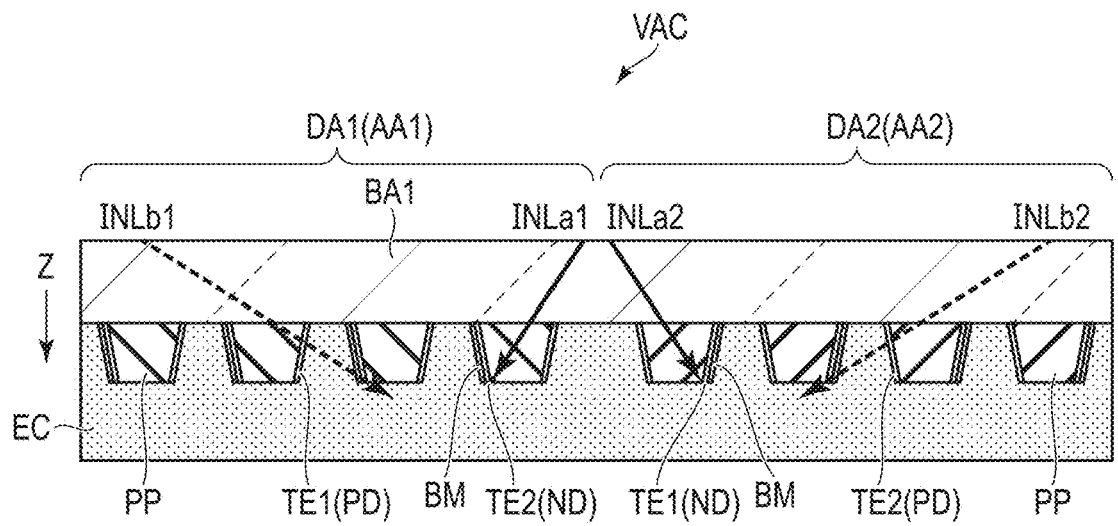
FIG. 10A is a diagram illustrating the viewing angle control element.
Figure 10B:
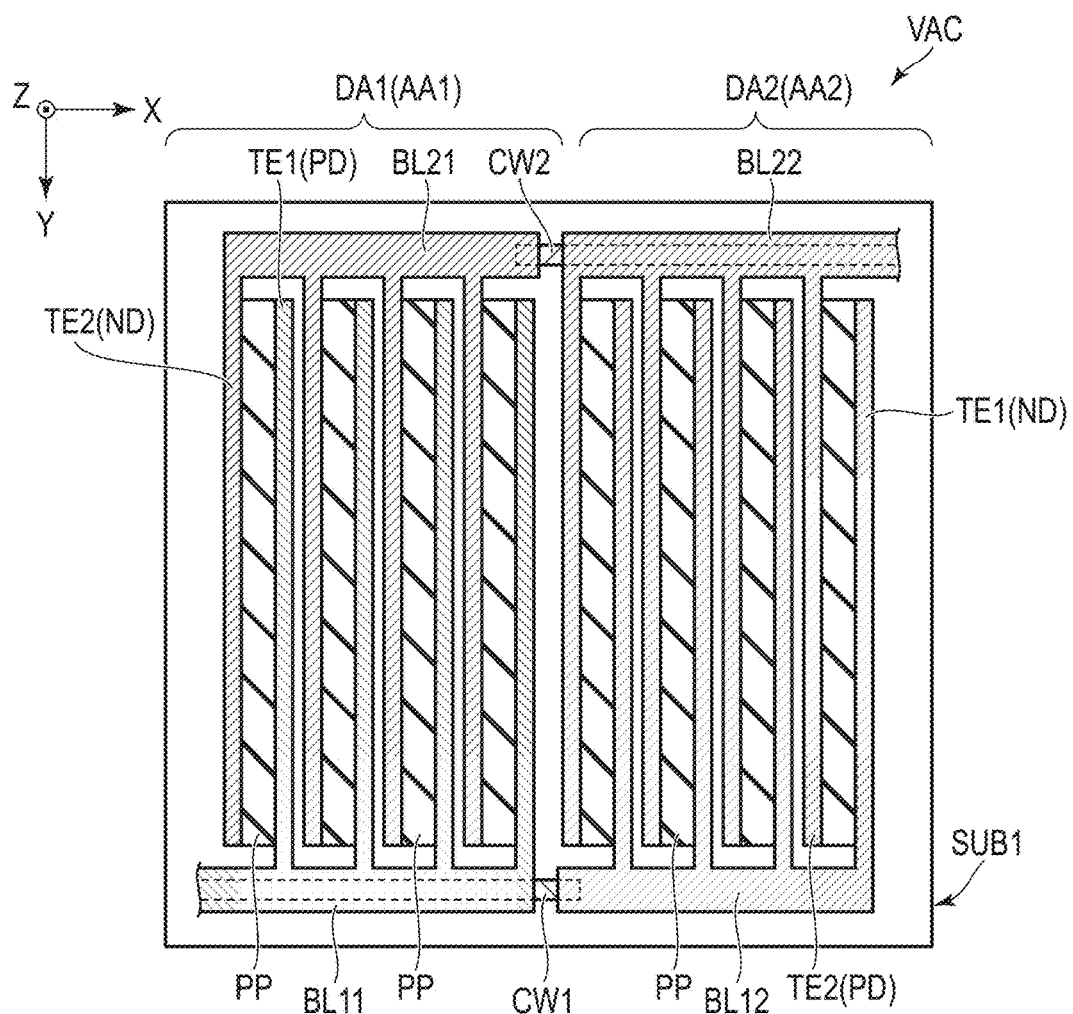
FIG. 10B is a diagram illustrating the viewing angle control element.

Here is a description of a configuration capable of applying a potential to each of the first and second transparent electrodes TE1 and TE2 provided in their respective active areas AA1 and AA2. FIGS. 10A and 10B illustrate a viewing angle control element. FIG. 10A is a sectional view of a viewing angle control element VAC and FIG. 10B is a plan view of the viewing angle control element VAC.

In the viewing angle control element VAC shown in FIGS. 10A and 10B, the first transparent electrode TE1 provided in the active area AA1 is formed integrally with the bus line BL11 and connected to the bus line BL 11. The second transparent electrode TE2 provided in the active area AA1 is formed integrally with the bus line BL12 and is connected to the bus line BL12.

The first transparent electrode TE1 provided in the active area AA2 is formed integrally with the bus line BL12 and connected to the bus line BL12. The second transparent electrode TE2 provided in the active area AA2 is formed integrally with a bus line BL22 and is connected to the bus line BL22.

The bus line BL12 is connected to a connection line CW1 superposed on the bus line BL12 in a planar view. The connection line CW1 and a connection line CW2, which is to be described later, are formed of a transparent conductive material such as indium tin oxide (ITO) and indium zinc oxide (IZO).

A bus line BL21 is connected to a connection line CW2 superposed on the bus line BL22 in a planar view.

The connection line CW1 is a line formed on a layer other than the bus line BL12 with an insulating layer therebetween. The connection line CW1 has only to be connected to the bus line BL12 via a contact hole formed in the insulating layer.

Similarly, the connection line CW2 is a line formed on a layer other than the bus line BL21 with an insulating layer therebetween. The connection line CW2 has only to be connected to the bus line BL21 via a contact hole formed in the insulating layer.

A low potential is applied to the second transparent electrode TE2 of the active area AA1 via the bus line BL21 and the connection line CW2. A high potential is applied to the first transparent electrode TE1 of the active area AA1 via the bus line BL11. Thus, the second transparent electrode TE2 of the active area AA1 functions as a negative electrode ND, and the first transparent electrode TE1 functions as a positive electrode PD.

A high potential is applied to the second transparent electrode TE2 of the active area AA2 via the bus line BL22. A low potential is applied to the first transparent electrode TE1 of the active area AA2 via the bus line BL12 and the connection line CW1. Thus, the second transparent electrode TE2 of the active area AA2 functions as a positive electrode PD, and the first transparent electrode TE1 functions as a negative electrode ND.

As described above, a viewing angle for the display device DSP shown in FIGS. 9A and 9B can be controlled using the viewing angle control element VAC shown in FIGS. 10A and 10B.

Configuration Example 1

FIG. 11 is a sectional view showing an configuration example of the viewing angle control element VAC according to the embodiment. The configuration example shown in FIG. 11 differs from that shown in FIG. 3 in that the projection PP has a triangular shape in a sectional view.

Components of the viewing angle control element VAC shown in FIG. 11, which are like or similar to those of the element VAC shown in FIG. 3, are denoted by similar reference numerals and their detailed descriptions will be omitted.

The viewing angle control element VAC shown in FIG. 11 has a projection PP (PP1, PP2, PP3 and PP4) which is shaped like a triangle in a sectional view. A first transparent electrode TE1 is provided on the side surface PA of the projection PP, and a first transparent electrode TE2 is provided on the side surface PB thereof. The first and second transparent electrodes TE1 and TE2 are electrically independent of each other.

More specifically, the projection PP shown in FIG. 11 has the shape of an isosceles triangle. The isosceles triangular PP has an apex PT instead of the top surface PU shown in FIG. 3. The upper end portion E1U of the first transparent electrode TE1 and the upper end portion E2U of the second transparent electrode TE2 are located below the apex PT so that the first and second transparent electrodes TE1 and TE2 are electrically independent of each other. In other words, the end portions E1U and E2U are located between the apex PT and the top surface B1A of the first base BA1.

The section of the projection PP shown in FIG. 11 has an acute angle including the apex PT, but the configuration example is not limited to the acute angle. The configuration example can be applied to the case where the periphery of the apex PT of the projection PP is rounded by etching or the like, for example, in the manufacturing process of the projection PP. In other words, the configuration example is applicable to a case where the curvature of the rounded periphery of the apex PT changes continuously.

In the projection PP shown in FIG. 11, the height from the bottom surface PL to the apex PT along the third direction Z is defined as height h2 as in FIG. 3, the angle between the side surface PA and the bottom surface PL is defined as ea, the width of the bottom surface PL (the width of a portion of the projection PP in contact with the top surface B1A) is defined as width W1, and the width of the side surface PA (the width of a portion of the projection PP covered with the first transparent electrode TE1) is defined as width W3. These widths each corresponds to the length along the first direction X. In addition, the angle between the side surface PB on the opposite side of the side surface PA and the bottom surface PL is also defined as ea, and the width of the side surface PB is defined as being equal to the width W3 of the first side surface PA.

Like in the embodiment, in the configuration example, too, the relationship between the height h2 of the projection PP and the viewing angles θb and θd is obtained from the equations (6) and (7). For example, when the viewing angles θb and θd are fixed, the optimum height h2 can be obtained from the equations (6) and (7). On the contrary, for example, when the height or the range thereof is fixed, the optimum values of the viewing angles θb and θd can be obtained from the equations (6) and (7).

As described with reference to FIGS. 4 and 5, a favorable pitch PC and the angle θα of the projection PP can be obtained.

The configuration example brings about the same advantages as those of the embodiment.

Configuration Example 2

Figure 12:
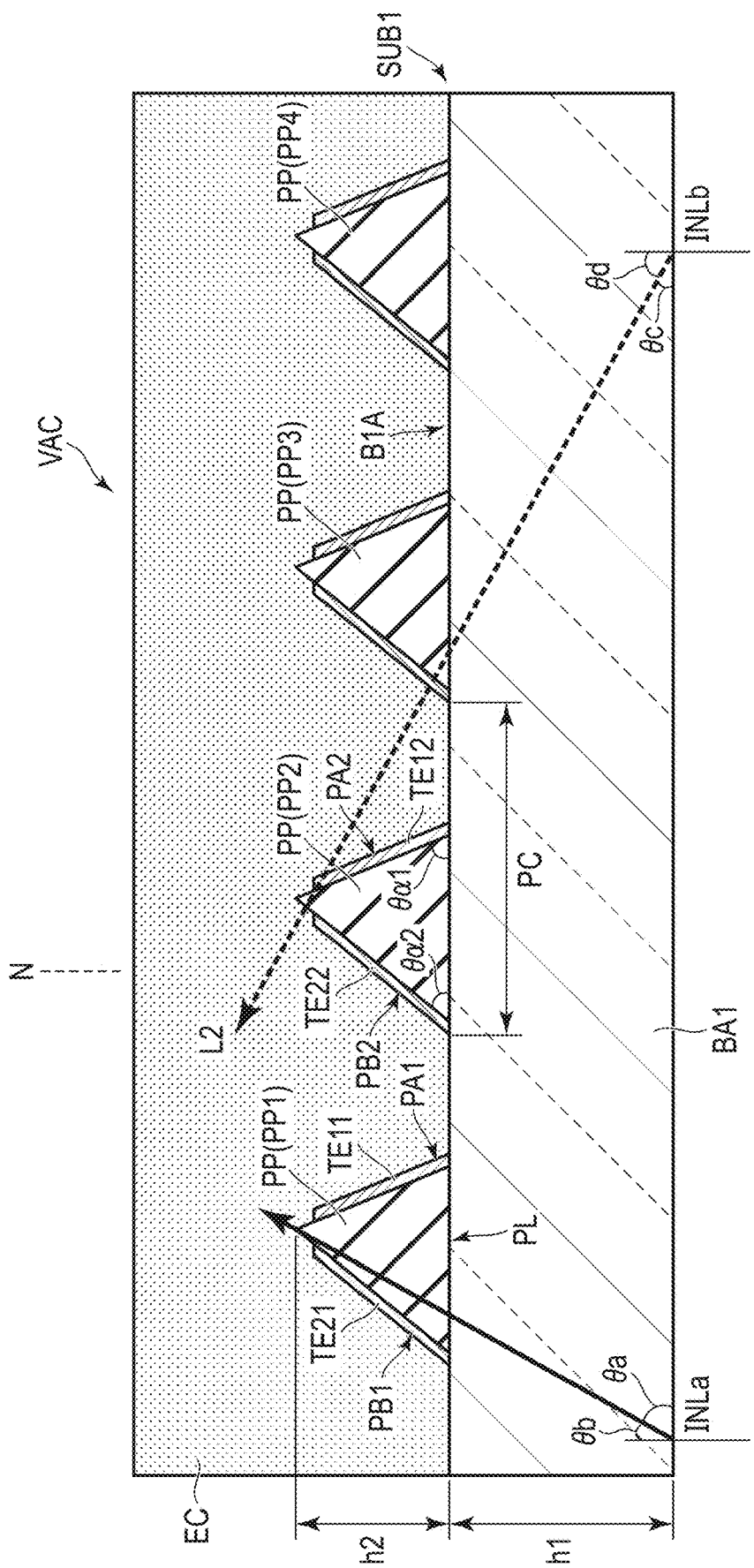
FIG. 12 is a sectional view showing a configuration example of the viewing angle control element of the embodiment.

FIG. 12 is a sectional view showing another configuration example of the viewing angle control element VAC according to the embodiment. The configuration example shown in FIG. 12 differs from that shown in FIG. 11 in that each projection has an asymmetric triangular shape.

In the viewing angle control element VAC shown in FIG. 12, the projection PP (PP1, PP2, PP3 and PP4) has an asymmetric triangular shape in a sectional view as described above. More specifically, the angle $\theta\alpha 1$ between the side surface PA and the bottom surface PL and the angle $\theta\alpha 2$ between the side surface PB and the bottom surface PL are different from each other ($\theta\alpha 1 \neq \theta\alpha 2$).

In the viewing angle control element VAC shown in FIG. 12, the equations (6) and (7) described in the embodiment can be replaced by the following equations (8) and (9).

$$\tan \theta b = (PC - (h2/\tan \theta\alpha 2))/h2 \qquad (8)$$

$$\tan \theta d = (PC + (h2/\tan \theta\alpha 1))/h2 \qquad (9)$$

In the configuration example shown in FIG. 12, too, the optimum values of the viewing angles $\theta b$ and $\theta d$ and the favorable pitch PC and angles $\theta\alpha 1$ and $\theta\alpha 2$ of the projection PP can be obtained from the equations (8) and (9).

In the example shown in FIG. 12, the angle $\theta\alpha 2$ of the projection PP is smaller than the angle $\theta\alpha 1$ ($\theta\alpha 2 < \theta\alpha 1$). However, the present configuration example is not limited to this relationship in angle. The angle $\theta\alpha 2$ may be larger than the angle $\theta\alpha 1$ ($\theta\alpha 2 > \theta\alpha 1$).

In addition, the projections PP may have the same sectional shape or may have different sectional shapes throughout the active area AA. For example, the angle $\theta\alpha 1$ may be larger than the angle $\theta\alpha 2$, in the active area AA1 shown in FIGS. 9A, 10A and 10B, and the angle $\theta\alpha 1$ may be smaller than the angle $\theta\alpha 2$ in the active area AA2 shown therein. Alternatively, the angle $\theta\alpha 1$ may be smaller than the angle $\theta\alpha 2$ in the active area AA1, and the angle $\theta\alpha 1$ may be larger than the angle $\theta\alpha 2$ in the active area AA2. The present configuration example can be applied to this shape.

The present configuration example also brings about the same advantages as those of the embodiment.

Configuration Example 3

Figure 13:
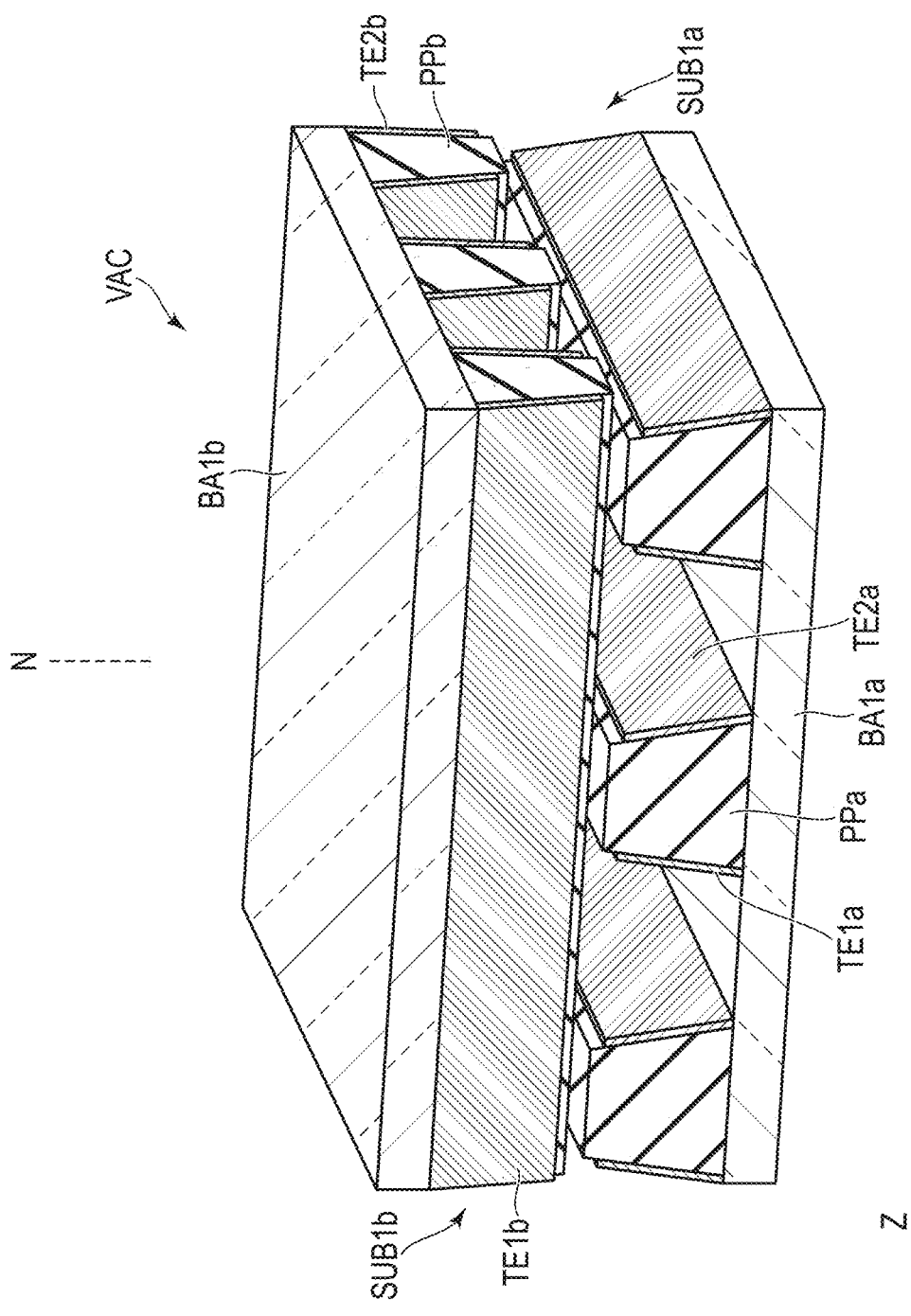
FIG. 13 is a perspective view showing a configuration example of the viewing angle control element of the embodiment.

FIG. 13 is a perspective view showing another configuration example of the viewing angle control element VAC according to the embodiment. The configuration example shown in FIG. 13 differs from that shown in FIG. 2 in that two substrates having projections are arranged alternately.

The viewing angle control element VAC shown in FIG. 13 includes a first substrate SUB1a and a second substrate SUB1b. The second substrate SUB1b corresponds to the first substrate SUB1 of the embodiment and thus has the same configuration as the first substrate SUB1.

FIGS. 14A and 14B are sectional views of the viewing angle control element shown in FIG. 13. FIG. 14A is a sectional view of the second substrate SUB1b in the Y-Z plane. FIG. 14B is a sectional view of the first substrate SUB1a in the X-Z plane.

As shown in FIG. 14B, the first substrate SUB1a includes a first base BA1a, a plurality of projections PPa, a first transparent electrode TE1a and a second transparent electrode TE2a. The projections PPa are arranged at intervals in the first direction X and extend along the second direction Y. The projections PPa project from the first base BA1a toward the second substrate SUB1b (along the third direction Z).

Each of the projections PPa has a bottom surface PLa facing the first base BA1a, a top surface PUa facing the second substrate SUB1b and side surfaces PAa and PBa. The side face PAa is provided with a first transparent electrode TE1a. The side surface PBa is provided with a second transparent electrode TE2a.

As shown in FIG. 14A, the second substrate SUB1b includes a second base BA1b, a plurality of projections PPb, a first transparent electrode TE1b and a second transparent electrode TE2b. The projections PPb are arranged at intervals in the second direction Y and extend along the first direction X. The projections PPb project from the second base BA1b toward the first substrate SUB1a (along a direction opposite to the third direction Z).

Each of the projections PPb has a bottom surface PLb facing the second base BA1b, a top surface PUb facing the first substrate SUB1a and side surfaces PAb and PBb. The side surface PAb is provided with a first transparent electrode TE1b. The side surface PBb is provided with a second transparent electrode TE2a.

In order to facilitate descriptions, the surface of the projection PPb located below the second base BA1b is defined as the top surface Pub and the surface thereof located above the top surface Pub is defined as the bottom surface PLb.

In order to distinguish the first and second transparent electrodes TE1a and TE2a of the first substrate SUB1a from each other, the first and second transparent electrodes TE1b and TE2b of the second substrate SUB1b may be referred to as third and fourth transparent electrodes, respectively.

The projections PPa and PPb may also be referred to as first and second projections, respectively. In addition, the side surfaces PAa and PBa of the projection PPa may also be referred to as first and second side surfaces, respectively, and the side surfaces PAb and PBb of the projection PPb may also be referred to as third and fourth side surfaces, respectively.

As shown in FIGS. 13, 14A and 14B, the projections PPa and PPb are so arranged that their extending directions are orthogonal to each other.

The first and second transparent electrodes TE1a and TE2a of the first substrate SUB1a are arranged in the first direction X along the side surfaces PAa and PBa, respectively, and extend along the second direction Y. The first and second transparent electrodes TE1b and TE2b of the second substrate SUB1b are arranged in the second direction Y along the side surfaces PAb and PBb, respectively, and extend along the first direction X.

Therefore, the first and second transparent electrodes TE1a and TE2a of the first substrate SUB1a and the first and second transparent electrodes TE1b and TE2b of the second substrate SUB1b extend in the directions orthogonal to each other.

Consider a case where a low potential is applied to the first and second transparent electrodes TE1a and TE2a of the first substrate SUB1a and the first transparent electrode TE1b of the second substrate SUB1b, and a high potential is applied to the second transparent electrode TE2b of the second substrate SUB1b.

In this case, the first and second transparent electrodes TE1a and TE2a, and the first transparent electrode TE1b of the second substrate SUB1b function as negative electrodes ND (cathodes). The second transparent electrode TE2b of the second substrate SUB1b functions as a positive electrode PD (anode).

When a potential is applied as described above, silver is deposited on the surfaces of the first and second transparent electrodes TE1a and TE2a and the first transparent electrode TE1*b*, which function as negative electrodes ND. Therefore, a light-shielding layer BM (not shown) is formed on these electrodes.

Figure 15:
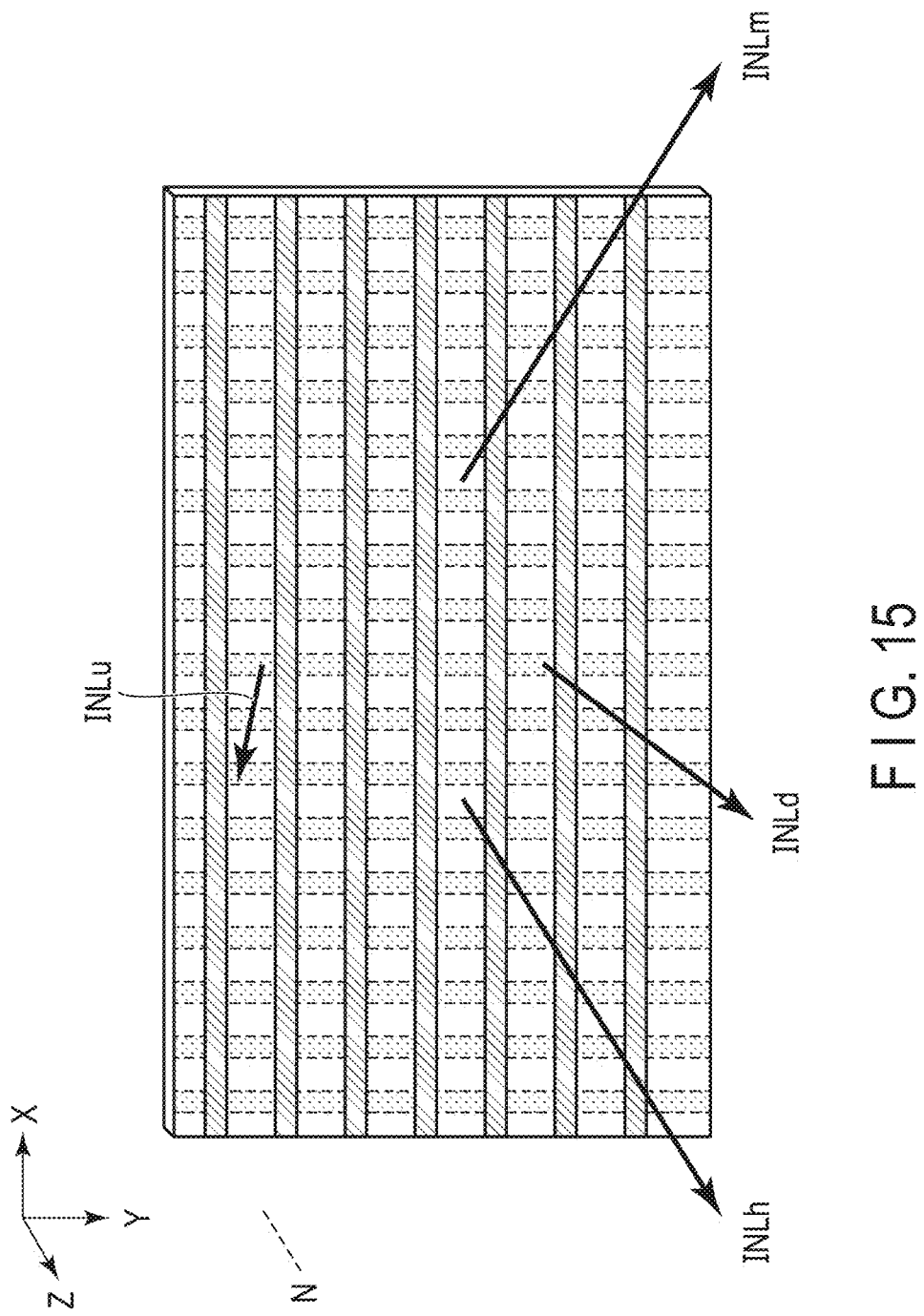
FIG. 15 is a perspective view of a viewing angle control element.

A case where the viewing angle control element VAC shown in FIGS. 13, 14A and 14B are viewed from a direction (front) along the normal N of the viewing angle control element VAC (a direction parallel to the third direction Z) will be described with reference to FIG. 15. FIG. 15 is a perspective view of the viewing angle control element, showing the relationship in position among the light-shielding layer BM1 formed on the first substrate SUB1*a*, the light-shielding layer BM2 formed on the second substrate SUB1*b*, incident light INLh transmitted to the left side toward the front, incident light INLm transmitted to the right side toward the front, incident light INLu transmitted to the upper side toward the front, and incident light INLd transmitted to the lower side toward the front.

The viewing angle control element VAC shown in FIG. 15 can control a viewing angle not only when the viewing position is inclined horizontally with respect to the direction along the normal N, but also when the viewing position is inclined vertically. When the viewing position is inclined horizontally, the viewing angle control element VAC is driven in the narrow viewing angle mode with respect to the incident light INLh and INLm transmitted from both the right and left sides by the light-shielding layers BM formed on both the first and second transparent electrodes TE1*a* and TE2*a*.

When the observation position is inclined vertically, for example, the viewing angle control element VAC is driven in the narrow viewing angle mode with respect to the incident light INLd transmitted downward by the light-shielding layer BM formed on the first transparent electrode TE1*b*. Since no light-shielding layer is formed for the incident light INLu transmitted upward to the contrary, the viewing angle control element VAC is driven in the wide viewing angle mode.

As described above, according to the present configuration example, a viewing angle control element capable of stereoscopic (three-dimensional) viewing angle control can be obtained.

As shown in FIG. 13, the projection PPa of the first substrate SUB1*a* and the projections PPb of the second substrate SUB1*b* are in contact with each other. Thus, the first transparent electrodes TE1*a* and TE2*a* provided on the projection PPa and the first transparent electrodes TE1*b* and TE2*b* provided on the projection PPb may come into contact with each other.

It is thus preferable that the upper end portion of each of the transparent electrodes be located below the top surface PU of the projection PP. More specifically, as shown in FIGS. 14A and 14B, in the first substrate SUB1*a*, the upper end portion E1Ua of the first transparent electrode TE1*a* and the upper end portion E2Ua of the second transparent electrode TE2*a* are located below the top surface PUa. In other words, the ends portions E1Ua and E2Ua are located between the top surface PUa of the projection PPa and the top surface B1A of the first base BA1.

In the second substrate SUB1*b*, the end portion E1Ub of the first transparent electrode TE1*b* and the end portion E2Ub of the second transparent electrode TE2*b* are located between the top surface PUb of the projection PPb and the second base BA1*b*.

If the end portion E1Ua of the first transparent electrode TE1*a*, the end portion E2Ua of the second transparent electrode TE2*a*, the end portion E1Ub of the first transparent electrode TE1*b*, and the end portion E2Ub of the second transparent electrode TE2*b* are arranged as described above, these transparent electrodes can be prevented from coming into contact with each other. In other words, no transparent electrodes are provided in the regions around the top surfaces PU of the projections PP, but the regions are exposed.

In the viewing angle control element VAC shown in FIGS. 13, 14A, 14B and 15, a low potential is applied to the first and second transparent electrodes TE1*a* and TE2*a* of the first substrate SUB1*a* and the first transparent electrode TE1*b* of the second substrate SUB1*b*, and a high potential is applied to the second transparent electrode TE2*b* of the second substrate SUB1*b*.

For example, a low potential may be applied to the first and second transparent electrodes TE1*a* and TE2*a* of the first substrate SUB1*a* and the second transparent electrode TE2*b* of the second substrate SUB1*b*, and a high potential may be applied to the first transparent electrode TE1*b* of the second substrate SUB1*b*. That is, a low potential may be applied to three of the first transparent electrode TE1*a*, second transparent electrode TE2*a*, first transparent electrode TE1*b* and second transparent electrode TE2*b*, and a high potential may be applied to the other one.

The viewing angle control element VAC can thus be driven in the narrow viewing angle mode for incident light transmitted to both the right and left sides and one of the upper and lower sides toward the front of the viewing angle control element VAC.

According to the present configuration example, the viewing angle control element VAC can be driven in the narrow viewing angle mode for incident light transmitted to one of the right and left sides and both the upper and lower sides toward the front of the viewing angle control element VAC.

In this case, a low potential may be applied to the first transparent electrode TE1*a* of the first substrate SUB1*a* and the first and second transparent electrodes TE1*b* and TE2*b* of the second substrate SUB1*b*, and a high potential may be applied to the second transparent electrode TE2*a* of the first substrate SUB1*a*. Alternatively, a low potential may be applied to the second transparent electrode TE2*a* of the first substrate SUB1*a* and the first and second transparent electrodes TE1*b* and TE2*b* of the second substrate SUB1*b*, and a high potential may be applied to the first transparent electrode TE1*a* of the first substrate SUB1*a*.

According to the present configuration example described above, a viewing angle control element capable of controlling a viewing angle in three of up, down, right and left directions with respect to the front can be obtained.

The present configuration example brings about the same advantages as those of the embodiment.

Configuration Example 4

FIG. 16 is a perspective view showing another configuration example of the viewing angle control element according to the embodiment. The configuration example shown in FIG. 16 differs from the configuration example shown in FIG. 13 in that a pedestal is provided between upper and lower projections.

Note that the components of the viewing angle control element VAC shown in FIG. 16, which overlap those in FIG. 13, will not be described in detail.

The viewing angle control element VAC shown in FIG. 16 includes a pedestal PDS between the first and second substrates SUB1*a* and SUB1*b*. More specifically, the pedestal PDS is disposed between the top surface PUa of the projection PPa of the first substrate SUB1a and the top surface PUb of the projection PPb of the second substrate SUB1b.

The pedestal PDS is formed of, for example, a transparent insulating material, and may be formed of either an organic material or an inorganic material. Furthermore, for example, it may be formed of the same material as that of the projections PP. The pedestal PDS insulates the first and second transparent electrodes TE1a and TE2a of the first substrate SUB1a and the first and second transparent electrodes TE1b and TE2b of the second substrate SUB1b.

In the viewing angle control element VAC shown in FIG. 16, the end portions E1Ua and E2Ua of the first and second transparent electrodes TE1a and TE2a of the first substrate SUB1a are aligned with the top surface PUa of the projection PPa and are located on the same plane. The end portions E1Ub and E2Ub of the first and second transparent electrode TE1b and TE2b of the second substrate SUB1b are aligned with the top surface PUb of the projection PPb and are located on the same plane.

However, the locations of the end portions E1Ua, E2Ua, E1Ub and E2Ub are not limited to the above. As in FIG. 13, the end portions E1Ua and E2Ua may be located between the top surface PUa of the projection PPa and the top surface B1A of the first base BA1. The end portions E1Ub and E2Ub may be located between the top surface PUb of the projection PPb and the second base BA1b.

The present configuration example brings about the same advantages as those of the embodiment.

Example

A more specific example of the viewing angle control element VAC according to the embodiment will be described.

The example will be described using the viewing angle control element VAC shown in FIG. 2. In the viewing angle control element VAC according to the example, the height h2 of the projection PP is defined as 50 μm, the width W1 of the bottom surface PL of the projection PP is defined as 50 μm, and the width GP of a gap between adjacent projections PP is defined as 50 μm. The pitch PC of the projections PP is 100 μm because PC=W1+GP.

The projections PP were formed using a photocuring resin. As described above, the height h2 of each projection PP, the width W1 of the lower surface PL, and the width GP of a gap between the projections PP are the same length of 50 μm. These parameters were determined for the following reasons in addition to the values capable of easy manufacturing.

Consider that the viewing angle control element VAC is superposed on the display panel PNL and is used as the display device DSP as shown in FIGS. 7, 8A, 8B, 9A and 9B. The display panel PNL includes a plurality of pixels PX, a plurality of signal lines SL and a plurality of scanning lines GL. When the size and pitch of the pixels PX and the like interfere with the width W1 and GP of the projection PP of the viewing angle control element VAC, moire or the like occurs to degrade the display quality of the display device DSP. More specifically, moire is likely to occur if the signal and scanning lines SL and GL of the pixels PX coincide with the end portions of the projections PP. It is therefore preferable that the width W1 of the bottom surface PL and the width GP of a gap between the projections PP each have a value that does not interfere with the size and pitch of the pixels PX and the like. In the example, the parameters were thus determined in view of the foregoing.

Figure 17:
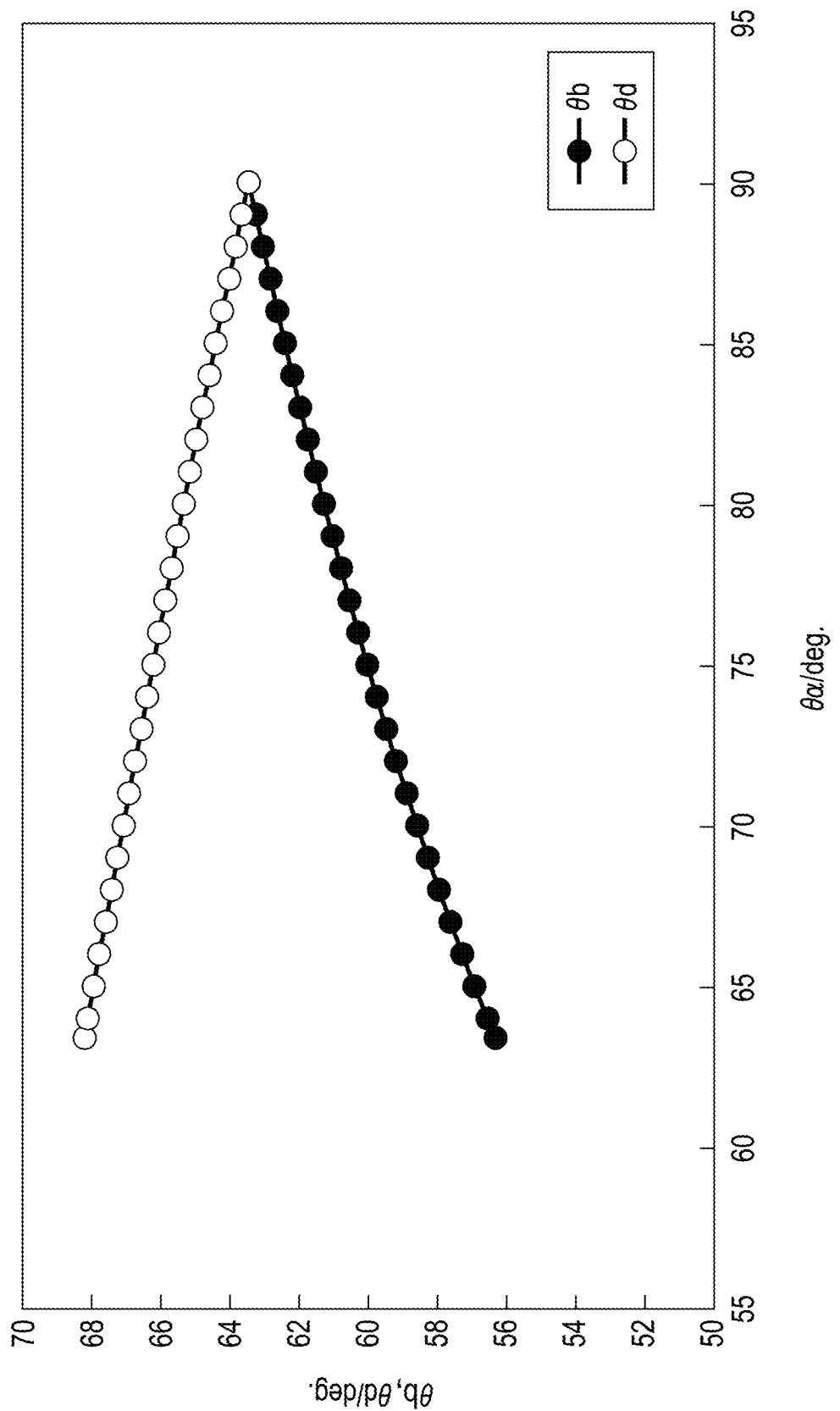
FIG. 17 is a graph showing the relationship between a viewing angle and the angle of a projection.
Figure 18:
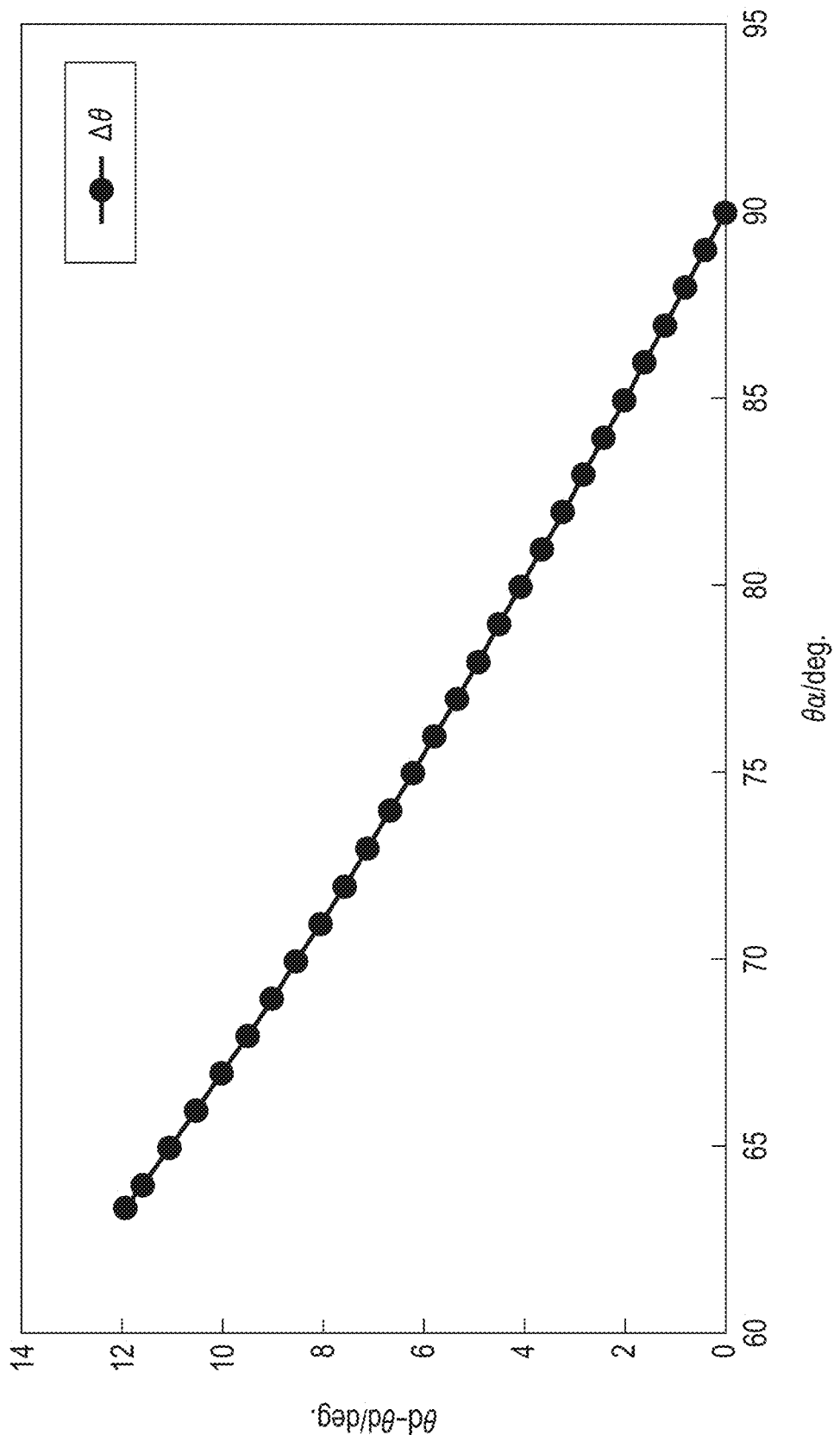
FIG. 18 is a graph showing the relationship between a viewing angle difference and the angle of a projection.

The relationship between the viewing angle and the angle of the projection PP in the viewing angle control element VAC with the parameters determined as described above will be described. FIG. 17 is a graph showing the relationship among the viewing angle $\theta b$ (transmission), the viewing angle $\theta d$ (transmission), and the angle $\theta \alpha$ of the projection PP. FIG. 18 is a graph showing the relationship between the viewing angle difference $\Delta \theta$ ($\Delta \theta = \theta d - \theta b$) and the angle $\theta \alpha$ of the projection PP. FIGS. 17 and 18 are derived from the equations (8) and (9) as in FIGS. 3 and 4.

As shown in FIGS. 17 and 18, the minimum value of the angle $\theta \alpha$ of the projection PP was 63.4°. The angle $\theta b$ was 56.3° and the angle $\theta d$ was 68.3°. Accordingly, the maximum viewing angle difference $\Delta \theta$ ($\theta d - \theta b$) is 12°.

As described above, according to the example, a viewing angle control element VAC capable of controlling a viewing angle can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A viewing angle control element comprising:
a first substrate including a first base;
a second substrate including a second base;
an electrochromic layer provided between the first base and the second base;
a plurality of projections formed on the first base;
a first area and a second area provided on each of the projections;
a first transparent electrode provided on the first area; and
a second transparent electrode provided on the second area, wherein
the first transparent electrode and the second transparent electrode are electrically independent of each other,
the projections, the first transparent electrode, and the second transparent electrode are arranged in a first direction and extend along a second direction intersecting the first direction, respectively;
the first transparent electrode is a negative electrode to which a low potential is applied, and the second transparent electrode is a positive electrode to which a high potential is applied;
a light-shielding layer is formed on the first transparent electrode;
each of the projections has a top surface facing the second base and a bottom surface facing the first base; and
when a height from the bottom surface to the top surface of each of the projections is h, an angle between the first area and the bottom surface is $\theta \alpha$, and a pitch of the projections is PC, a first viewing angle $\theta 1$ in the first direction and a second viewing angle $\theta 2$ in a direction opposite to the first direction are represented by equations given below:

$$\tan \theta 1 = (PC - (h/\tan \theta \alpha))/h$$

$$\tan \theta 2 = (PC + (h/\tan \theta \alpha))/h.$$

2. The viewing angle control element according to claim 1, wherein the first transparent electrode and the second transparent electrode are applied with different potentials.

3. The viewing angle control element according to claim 1, wherein one of the first transparent electrode and the second transparent electrode is a positive electrode to which a high potential is applied, and the other thereof is a negative electrode to which a low potential is applied.

4. The viewing angle control element according to claim 1, wherein each of the projections has a rectangular section.

5. The viewing angle control element according to claim 4, wherein each of the projections has a trapezoidal section.

6. The viewing angle control element according to claim 1, wherein each of the projections has a triangular section.

7. The viewing angle control element according to claim 4, wherein:
each of the projections has a top surface facing the second base; and
the top surface is in contact with the electrochromic layer.

8. A viewing angle control element comprising:
a first substrate including a first base;
a second substrate including a second base;
an electrochromic layer provided between the first base and the second base;
a plurality of first projections formed on the first base;
a first side surface and a second side surface provided on each of the first projections;
a first transparent electrode provided on the first side surface;
a second transparent electrode provided on the second side surface;
a plurality of second projections formed on the second base;
a third side surface and a fourth side surface provided on each of the second projections;
a third transparent electrode provided on the third side surface; and
a fourth transparent electrode provided on the fourth side surface,
wherein:
the first transparent electrode and the second transparent electrode are electrically independent of each other;
the third transparent electrode and the fourth transparent electrode are electrically independent of each other; and
a direction in which the first projections extend and a direction in which the second projections extend intersect each other.

9. The viewing angle control element according to claim 8, wherein three of the first transparent electrode, the second transparent electrode, the third transparent electrode, and the fourth transparent electrode are negative electrodes to which a low potential is applied, and the other one thereof is a positive electrode to which a high potential is applied.

10. The viewing angle control element according to claim 8, wherein each of the first projections and second projections has a rectangular section.

11. The viewing angle control element according to claim 10, wherein each of the first projections and second projections has a trapezoidal section.

12. The viewing angle control element according to claim 8, wherein each of the first projections and second projections has a triangular section.

13. The viewing angle control element according to claim 8, wherein a pedestal is provided between a top surface of each of the first projections and a top surface of each of the second projections.

14. A display device comprising:
a display panel including a plurality of pixels; and
a viewing angle control element superposed on the display panel,
the viewing angle control element including:
a first substrate including a first base;
a second substrate including a second base;
an electrochromic layer provided between the first base and the second base;
a plurality of projections formed on the first base;
a first area and a second area provided on each of the projections;
a first transparent electrode provided on the first area; and
a second transparent electrode provided on the second area, wherein
the first transparent electrode and the second transparent electrode are electrically independent of each other,
the projections, the first transparent electrode, and the second transparent electrode are arranged in a first direction and extend along a second direction intersecting the first direction, respectively;
the first transparent electrode is a negative electrode to which a low potential is applied, and the second transparent electrode is a positive electrode to which a high potential is applied;
a light-shielding layer is formed on the first transparent electrode;
each of the projections has a top surface facing the second base and a bottom surface facing the first base; and
when a height from the bottom surface to the top surface of each of the projections is h, an angle between the first area and the bottom surface is $\theta\alpha$, and a pitch of the projections is PC, a first viewing angle $\theta1$ in the first direction and a second viewing angle $\theta2$ in a direction opposite to the first direction are represented by equations given below:

$$\tan \theta1 = (PC - (h/\tan \theta\alpha))/h$$

$$\tan \theta2 = (PC + (h/\tan \theta\alpha))/h.$$

15. The display device according to claim 14, wherein one of the first transparent electrode and the second transparent electrode is a positive electrode to which a high potential is applied, and the other thereof is a negative electrode to which a low potential is applied.

16. The display device according to claim 14, wherein each of the projections has a rectangular section.

17. The display device according to claim 16, wherein each of the projections has a trapezoidal section.

18. The display device according to claim 14, wherein each of the projections has a triangular section.

* * * * *